(12) United States Patent
Lee

(10) Patent No.: US 7,551,543 B2
(45) Date of Patent: Jun. 23, 2009

(54) OPTICAL INFORMATION STORAGE MEDIUM HAVING A TRANSITION AREA PROVIDED BETWEEN FIRST AREA AND SECOND AREA OF LEAD-IN AREA AND REPRODUCING AND/OR RECORDING APPARATUS FOR USE THEREWITH

(75) Inventor: Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/024,150

(22) Filed: Feb. 1, 2008

(65) Prior Publication Data

US 2008/0151741 A1 Jun. 26, 2008

Related U.S. Application Data

(63) Continuation of application No. 10/766,959, filed on Jan. 30, 2004, now Pat. No. 7,382,714.

(30) Foreign Application Priority Data

Jan. 30, 2003 (KR) .................................. 2003-6286

(51) Int. Cl.
*G11B 7/24* (2006.01)
(52) U.S. Cl. .................................................. 369/275.3
(58) Field of Classification Search ........................ None
See application file for complete search history.

(56) References Cited

U.S. PATENT DOCUMENTS

| | | | |
|---|---|---|---|
| 5,283,779 A | 2/1994 | Otsuki | |
| 5,373,498 A | 12/1994 | Tagiri | |
| 5,706,268 A | 1/1998 | Horimai | |
| 6,580,684 B2 * | 6/2003 | Miyake et al. | 369/275.3 |
| 6,661,768 B1 | 12/2003 | Yumiba et al. | |
| 6,904,011 B2 | 6/2005 | Van Woudenberg et al. | |
| 7,065,015 B2 | 6/2006 | Lee et al. | |

(Continued)

FOREIGN PATENT DOCUMENTS

JP 6-176367 6/1994

(Continued)

OTHER PUBLICATIONS

Office Action issued on Nov. 21, 2006 by the Korean Intellectual Property Office for Korean Patent Application No. 2003-6286.

(Continued)

*Primary Examiner*—Paul Huber
(74) *Attorney, Agent, or Firm*—Stein McEwen, LLP

(57) ABSTRACT

A recording apparatus for use with a reproduction-only optical information storage medium, including: a recording unit which records data on the reproduction-only optical information storage medium; and a controller which controls the recording unit to form, on the reproduction-only optical storage medium, a plurality of areas and at least one transition area. Each transition area is located between two adjacent areas. The transition area allows data to be smoothly reproduced from the reproduction-only optical information storage medium at a low error generation rate. Also, since the optical information storage medium provides standards for the transition area, it is compatible with existing optical information storage media.

2 Claims, 30 Drawing Sheets

U.S. PATENT DOCUMENTS

| | | |
|---|---|---|
| 7,085,221 B2 | 8/2006 | Lee et al. |
| 7,113,475 B2 | 9/2006 | Lee et al. |
| 7,164,633 B2 | 1/2007 | Iida et al. |
| 7,170,841 B2 | 1/2007 | Shoji et al. |
| 2002/0027869 A1 | 3/2002 | Morita et al. |
| 2003/0002429 A1 | 1/2003 | Morita |
| 2003/0185128 A1 | 10/2003 | Shoji et al. |
| 2003/0227853 A1 | 12/2003 | Kim et al. |
| 2004/0001414 A1 | 1/2004 | Kadowaki et al. |
| 2004/0013067 A1 | 1/2004 | Lee et al. |
| 2004/0013074 A1 | 1/2004 | Lee et al. |
| 2004/0196758 A1 | 10/2004 | Lee |
| 2004/0228254 A1 | 11/2004 | Lee |
| 2005/0002307 A1 | 1/2005 | Lee |
| 2005/0041554 A1 | 2/2005 | Park et al. |
| 2005/0105320 A1 | 5/2005 | Suh et al. |
| 2005/0169158 A1 | 8/2005 | Abe et al. |
| 2005/0207293 A1 | 9/2005 | Kim |
| 2007/0019531 A1 | 1/2007 | Lee |

FOREIGN PATENT DOCUMENTS

| | | |
|---|---|---|
| JP | 9-320205 | 12/1997 |
| JP | 10/222874 | 8/1998 |
| JP | 2002-260243 | 9/2002 |
| JP | 2003-109258 | 4/2003 |
| KR | 2004-1596 | 1/2004 |
| WO | WO 2004/003898 | 1/2004 |

OTHER PUBLICATIONS

Search Report issued on Apr. 5, 2007 by the European Patent Office for European Patent Application No. 04706884.6.

Office Action issued on Jun. 6, 2007 by the Taiwanese Intellectual Property Office for Taiwanese Patent Application No. 93102103.

U.S. Appl. No. 10/766,889, filed Jan. 30, 2004, Kyung-geun Lee, Samsung Electronics Co., Ltd.

U.S. Appl. No. 10/766,958, filed Jan. 30, 2004, Kyung-geun Lee, Samsung Electronics Co., Ltd.

U.S. Appl. No. 10/766,959, filed Jan. 30, 2004, Kyung-geun Lee, Samsung Electronics Co., Ltd.

U.S. Appl. No. 11/527,685, filed Sep. 27, 2006, Kyung-geun Lee, Samsung Electronics Co., Ltd.

U.S. Appl. No. 12/024,158, filed Feb. 1, 2008, Kyung-geun Lee, Samsung Electronics Co., Ltd.

* cited by examiner

OPTICAL INFORMATION STORAGE MEDIUM HAVING A TRANSITION AREA PROVIDED BETWEEN FIRST AREA AND SECOND AREA OF LEAD-IN AREA AND REPRODUCING AND/OR RECORDING APPARATUS FOR USE THEREWITH

CROSS-REFERENCE TO RELATED APPLICATIONS

This application is a continuation of U.S. patent application Ser. No. 10/766,959 filed Jan. 30, 2004, now U.S. Pat. No. 7,382,714, the disclosure of which is incorporated herein in its entirety by reference. This application also claims the priority of Korean Patent Application No. 2003-6286, filed on Jan. 30, 2003, in the Korean Intellectual Property Office, the disclosure of which is incorporated herein in its entirety by reference.

BACKGROUND OF THE INVENTION

1. Field of the Invention

The present invention relates to a recording/reproducing apparatus, and more particularly, to a recording/reproducing apparatus for an optical information storage medium including a transition area for transiting between two adjacent areas among the areas forming the storage medium.

2. Description of the Related Art

Optical information storage media, for example, optical disks, are widely used in optical pickup apparatuses for recording/reproducing information in a non-contact way. Optical disks are classified as compact disks (CDs) or digital versatile disks (DVDs) according to their information storage capacity. Examples of recordable optical disks are 650 MB CD-R, CD-RW, 4.7 GB DVD+RW, and the like. Furthermore, HD-DVDs having a recording capacity of 20 GB or greater are under development.

The compatibility of the above optical information storage media with one another increases user convenience. In consideration of the economical efficiency and the convenience of users, storage media have different standards for different types. Storage media that have no determined standards yet are undergoing standardization. To achieve this standardization, a storage medium must be developed that has a format that can guarantee compatibility and consistency with existing storage media.

A conventional reproduction-only optical disk includes a burst cutting area (BCA), a lead-in area, a user data area, and a lead-out area. The BCA stores information about the serial number of the optical disk, and the lead-in area stores disk-related information. Here, the serial number of the optical disk is recorded as a barcode.

The BCA, the lead-in area, the user data area, and the lead-out area are consecutively arranged with no transition areas between adjacent areas. However, when the BCA, the lead-in area, and the user data area have different pit patterns, consecutive data reproduction may not be properly performed because of the absence of transition areas.

SUMMARY OF THE INVENTION

The present invention provides an optical information storage medium which includes a plurality of areas and a transition area between two adjacent areas so as to achieve smooth data reproduction.

According to an aspect of the present invention, there is provided aa recording apparatus for use with a reproduction-only optical information storage medium, including: a recording unit which records data on the reproduction-only optical information storage medium; and a controller which controls the recording unit to form a plurality of areas on the reproduction-only optical storage medium, and controls the recording unit to form at least one transition area between two adjacent areas.

Data may be recorded in the form of pits in the areas and the transition area.

A pit pattern of the transition area may be the same as a pit pattern of an area in front of the transition area or as a pit pattern of an area at rear of the transition area.

The transition area may be a mirror area.

Pits of the transition area may be formed in a straight pattern or a wobbling pattern.

A track pitch of pits in the transition area may be the same as track pitches of pits in the adjacent areas. Alternatively, the track pitch of pits in the transition area and the track pitches of pits in the adjacent area may be different. The track pitch of pits formed in the transition area may gradually increase or decrease from the track pitch of pits formed in the area preceding the transition area to the track pitch of pits formed in the area following the transition area.

According to another aspect of the present invention, there is provided an apparatus for use with a reproduction-only optical information storage medium, including: a recording unit which records data on the reproduction-only optical information storage medium; and a controller which controls the recording unit to form, on the reproduction-only optical information storage medium, a burst cutting area (BCA), a lead-in area, a user data area; a lead-out area, and a transition area located in at least one of an area between the BCA and the lead-in area, an area between the lead-in area and the user data area, and an area between the user data area and the lead-out area. The BCA, the lead-in area, the user data area, and the lead out area are formed of pits.

A first transition area may be included between the BCA and the lead-in area, and the BCA, the lead-in area, and the first transition area may each formed of pits in a straight pattern or a wobbling pattern.

A second transition area may be included between the lead-in area and the user data area, and the lead-in area, the user data area, and the second transition area may each formed of pits in a straight pattern or a wobbling pattern.

When pits for the first or second transition area may be formed in a wobbling pattern, the amplitude of a wobble may gradually decrease or increase.

According to still another aspect of the present invention, there is provided an apparatus for use with a reproduction-only optical information storage medium, including: a recording unit which records data on the reproduction-only optical information storage medium; and a controller which controls the recording unit to form, on the reproduction-only optical information storage medium, a burst cutting area (BCA), a lead-in area, a user data area, a lead-in area, and a transition area. The transition area is located between two adjacent sub-areas.

According to another aspect of the present invention, there is provided a reproducing apparatus for use with a reproduction-only optical information storage medium, including: a reading unit which reproduces data from the reproduction-only optical information storage medium; and a controller which controls the reading unit to reproduce data from a plurality of areas on the reproduction-only optical storage medium, and controls the reading unit to reproduce data from at least one transition area located between two adjacent areas.

According to another aspect of the present invention, there is provided a reproducing apparatus for use with a reproduction-only optical information storage medium, including: a reading unit which reproduces data from the reproduction-only optical information storage medium; and a controller which controls the reading unit to reproduce data from at least one of a burst cutting area (BCA), a lead-in area, a user data area, and a lead-out area, and controls the reading unit to reproduce data from a transition area located in at least one of an area between the BCA and the lead-in area, an area between the lead-in area and the user data area, and an area between the user data area and the lead-out area. The BCA, the lead-in area, the user data area, and the lead out area are formed of pits.

According to another aspect of the present invention, there is provided a reproducing apparatus for use with a reproduction-only optical information storage medium, including: a reading unit which reproduces data from the reproduction-only optical information storage medium; and a controller which controls the reading unit to reproduce data from at least one of a burst cutting area (BCA), a lead-in area, a user data area, and a lead-in area, and controls the reading unit to reproduce data from a transition area. At least one of the BCA, the lead-in area, the user data area, and the lead-out area is divided into a plurality of sub-areas. The transition area is located between two adjacent sub-areas.

According to another aspect of the present invention, there is provided a recording and reproducing apparatus for use with a read-only optical information storage medium having a plurality of areas, including: a recording and reading unit which records data in and reads data from a plurality of areas; and a controller which controls the recording and reading unit to form a plurality of areas and at least one transition area on the reproduction-only optical storage medium, and controls the recording and reading unit to read data from the least one of the plurality of areas and one of the at least one transition area. Each transition area is located between two adjacent areas.

According to another aspect of the present invention, there is provided a recording and reproducing apparatus for use with a read-only optical information storage medium having a plurality of areas, including: a recording and reading unit which records data in and reads data from a plurality of areas; and a controller which controls the recording and reading unit to form, on the reproduction-only optical storage medium, a burst cutting area (BCA), a lead-in area, a user data area, a lead-out area, and a transition area located in at least one of an area between the BCA and the lead-in area, an area between the lead-in area and the user data area, and an area between the user data area and the lead-out area, and controls the recording and reading unit to read data from at least one of the burst cutting area (BCA), the lead-in area, the user data area, the lead-out area, and the transition area. The BCA, the lead-in area, the user data area, and the lead out area are formed of pits.

According to another aspect of the present invention, there is provided a recording and reproducing apparatus for use with a read-only optical information storage medium having a plurality of areas, including: a recording and reading unit which records data in and reads data from a plurality of areas; and a controller which controls the recording and reading unit to form, on the reproduction-only optical storage medium, a burst cutting area (BCA), a lead-in area, a user data area, a lead-in area, and a transition area, and controls the recording and reading unit to read data from the transition area and at least one of the burst cutting area (BCA), the lead-in area, the user data area, and the lead-in area. At least one of the BCA, the lead-in area, the user data area, and the lead-out area is divided into a plurality of sub-areas. The transition area is located between two adjacent sub-areas.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
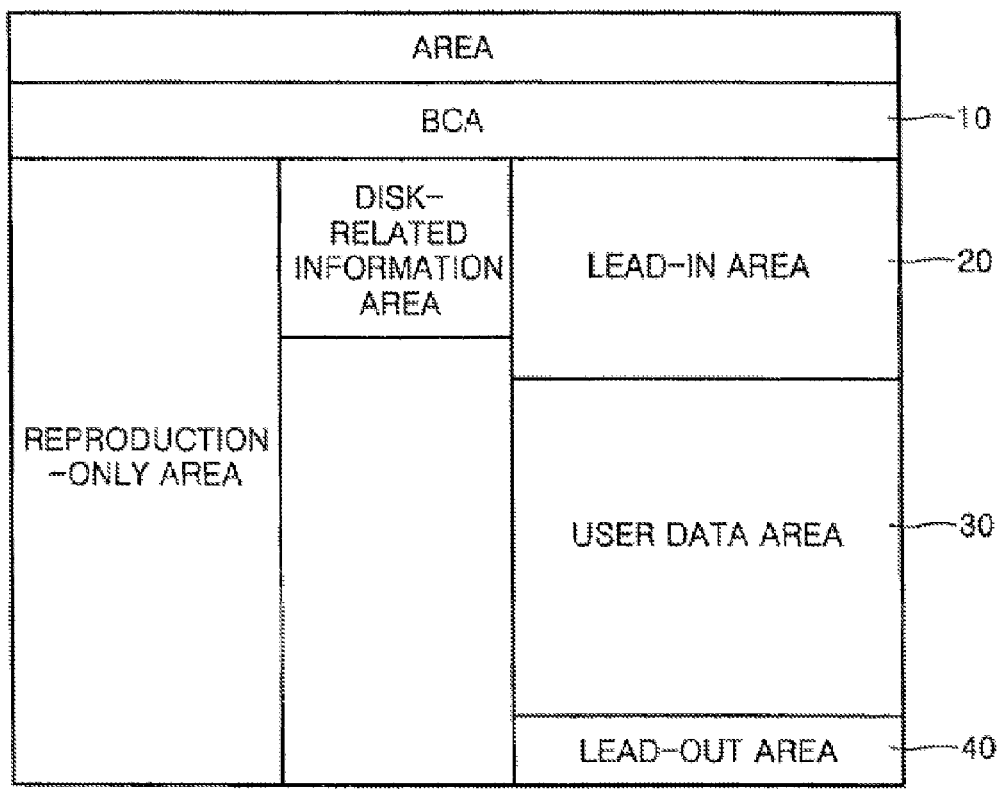
FIG. 1 shows a physical structure of a reproduction-only optical information storage medium generated by and/or usable with a recording and/or reproducing apparatus according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

An optical information storage medium generated by and/or usable with a recording and/or reproducing apparatus according to various embodiments of the present invention is reproduction-only, and the entire area thereof is formed of pits. The optical information storage medium is divided into a plurality of areas according to function. As shown in FIG. 1, the optical information storage medium generated by and/or usable with a recording and/or reproducing apparatus according to an embodiment of the present invention includes a burst cutting area (BCA) 10, a lead-in area 20, a user data area 30 for storing user data, and a lead-out area 40, which are sequentially formed from the inner boundary to the outer boundary of the optical information storage medium.

The BCA 10 stores the serial number of an optical information storage medium, for example, an optical disk, or data identifying the BCA. The lead-in area 20 stores disk-related information, copy protection information, and the like. Examples of the disk-related information are information about the type of information storage medium, such as a recordable disk, a write-one disk, or a reproduction-only disk, information about the number of recording layers, information about a recording speed, information about the disk size, and the like.

Referring to FIG. 2A through 2F, an optical information storage medium generated by and/or usable with a recording and/or reproducing apparatus according to a first embodiment of the present invention includes a first transition zone 15 between the BCA 10 and the lead-in area 20.

The BCA 10 stores data recorded in a first straight pit pattern. The lead-in area 20 stores data that may be recorded in a second straight pit pattern, which is different from the first straight pit pattern, or in a wobbling pit pattern. Alternatively, the BCA 10 stores data recorded in a first wobbling pit pattern, and the lead-in area 20 stores data that may be recorded in a second wobbling pit pattern, which is different from the first wobbling pit pattern, or in a straight pit pattern. A straight pit pattern denotes an arrangement of pits along a straight line, and a wobbling pit pattern denotes an arrangement of pits along a wavy line.

The first and second straight pit patterns and the first and second wobbling pit patterns may be classified as a single pattern, a specific pattern, or a random pattern. The single pattern denotes a pattern in which pits, each having an identical length (nT), are arranged at regular intervals. Here, n denotes a natural number, and T denotes the minimum length of a pit. For example, a straight single pit pattern denotes a pattern in which pits each having an identical length are arranged along a straight line. A wobbling single pit pattern denotes a pattern in which pits each having an identical length are arranged along a wavy line. The specific pattern denotes a repetition of a pattern of pits having different lengths. For example, a pattern of a 3T pit and a 6T pit repeats. A straight specific pit pattern denotes a repetition of a pattern of pits that have different lengths along a straight line. A wobbling specific pit pattern denotes a repetition of a pattern of pits with different lengths along a wavy line. The random pattern denotes a random arrangement of pits having different lengths. For example, a straight random pit pattern denotes a random arrangement of pits with different lengths along a straight line. A wobbling random pit pattern denotes a random arrangement of pits with different lengths along a wavy line.

Because the BCA 10 and the lead-in area 20 have different pit patterns, the first transition area 15 is included between the BCA 10 and the lead-in area 20 in order to prevent an improper consecutive reproduction of data. The first transition area 15 stores data identifying a transition area.

Figure 2A:
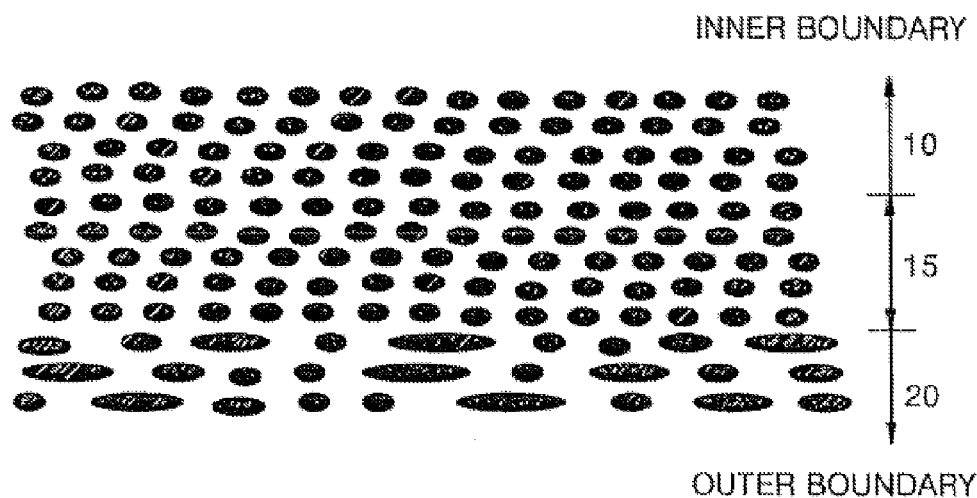
FIG. 2A through 2E show examples of a pit pattern for a transition area between a burst cutting area (BCA) and a lead-in area of an optical information storage medium generated by and/or usable with a recording and/or reproducing apparatus according to a first embodiment of the present invention when pits for the BCA are formed in a single pattern and pits for the lead-in area are formed in a straight random pattern.

FIG. 2A through 2E show examples of a pit pattern for the first transition area 15 when the BCA 10 is formed of pits in a straight single pattern and the lead-in area 20 is formed of pits in a straight random pattern. As shown in FIG. 2A, data is recorded in the BCA 10 in the form of a straight single pattern of pits, data is recorded in the lead-in area 20 in the form of a straight random pattern of pits, and the first transition area 15 between the BCA 10 and the lead-in area 20 is formed of a straight single pattern of pits. Although not shown, the first transition area 15 may be formed of a wobbling single pattern of pits.

Figure 2B:
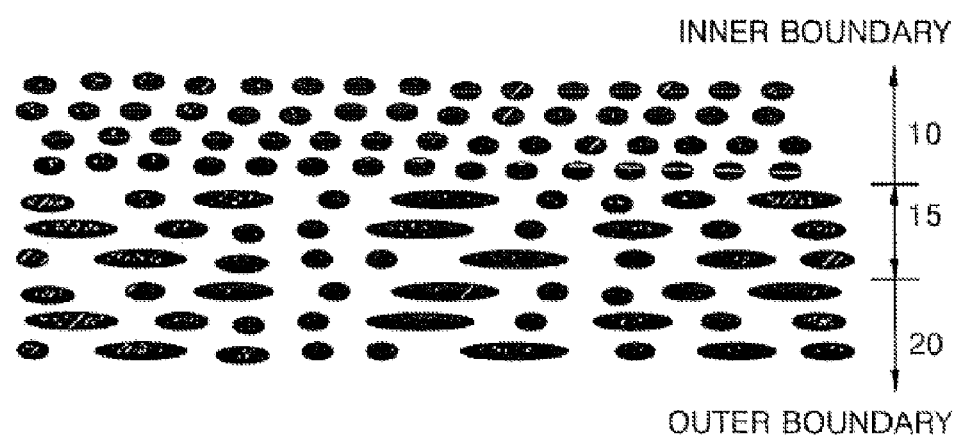

As shown in FIG. 2B, data is recorded in the BCA 10 in the form of a straight single pattern of pits, data is recorded in the lead-in area 20 in the form of a straight random pattern of pits, and the first transition area 15 between the BCA 10 and the lead-in area 20 is formed of a straight random pattern of pits. Although not shown, the first transition area 15 may be formed of a wobbling random pattern of pits.

Figure 2C:
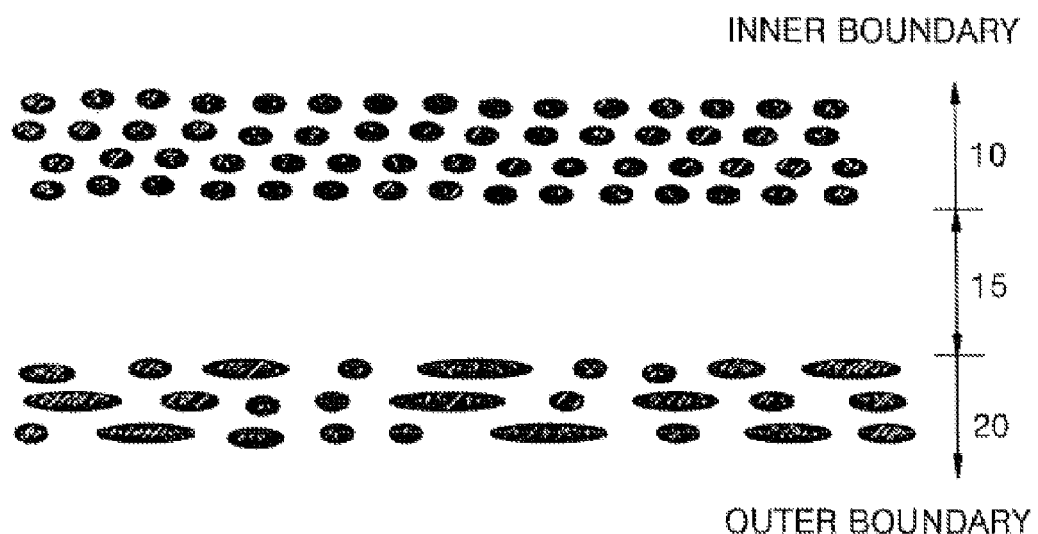

As shown in FIG. 2C, data is recorded in the BCA 10 in the form of a straight single pattern of pits, data is recorded in the lead-in area 20 in the form of a straight random pattern of pits, and the first transition area 15 between the BCA 10 and the lead-in area 20 is a mirror area.

Figure 2D:
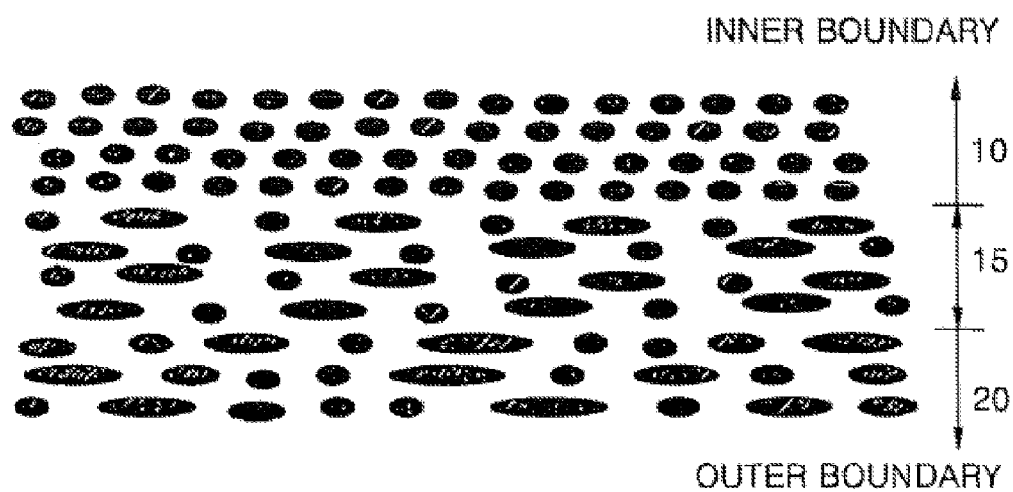

As shown in FIG. 2D, data is recorded in the BCA 10 in the form of a straight single pattern of pits, data is recorded in the lead-in area 20 in the form of a straight random pattern of pits, and the first transition area 15 between the BCA 10 and the lead-in area 20 is formed of a straight specific pattern of pits.

Figure 2E:
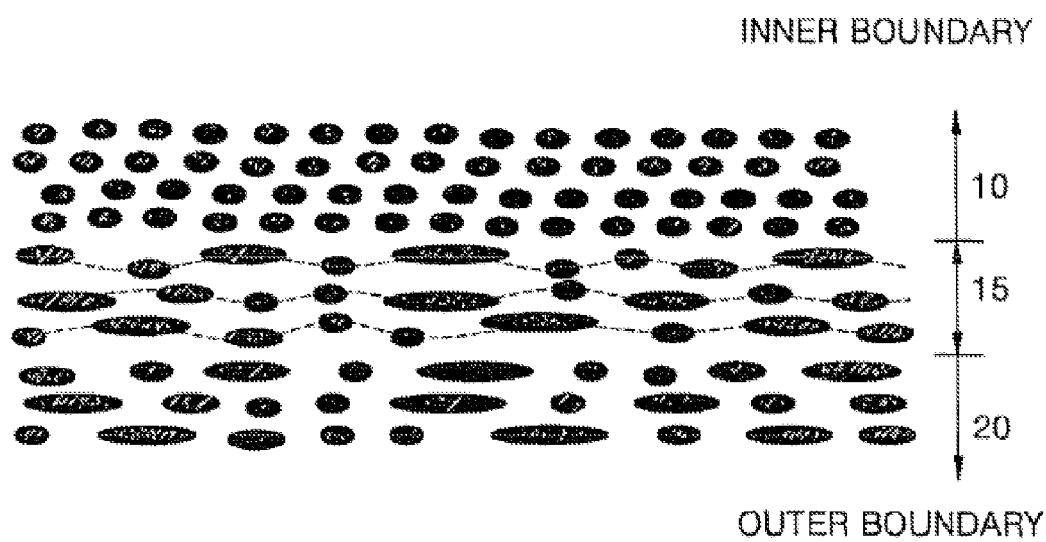

Alternatively, the first transition area 15 may be formed of a wobbling single pattern of pits, a wobbling random pattern of pits, or a wobbling specific pattern of pits. In FIG. 2E, the first transition area 15 is formed of a wobbling random pattern of pits.

Although FIGS. 2A through 2E show the BCA 10 formed of a straight single pattern of pits, the BCA 10 may be formed of a wobbling single pattern of pits.

Figure 3A:
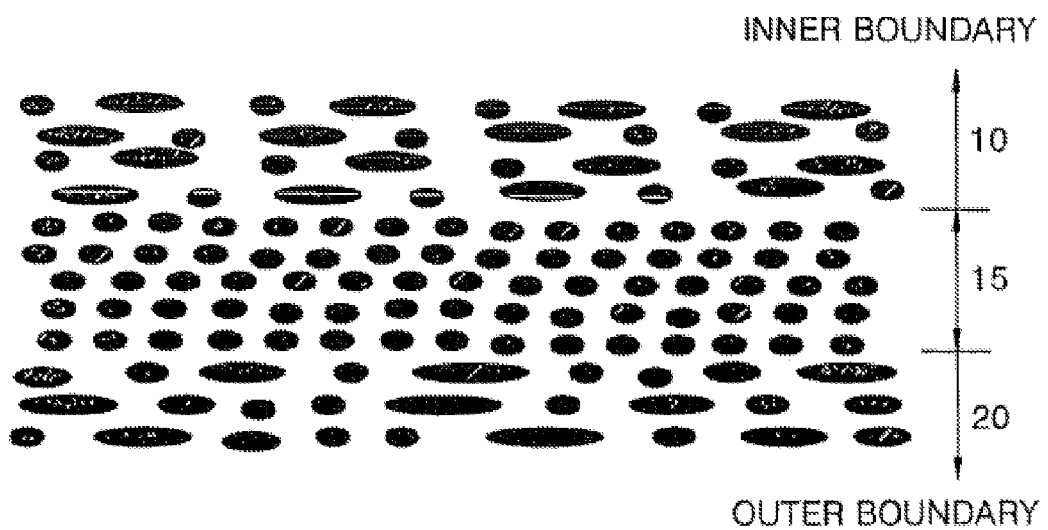
FIGS. 3A through 3E show examples of a pit pattern for a transition area between the BCA and the lead-in area of the optical information storage medium generated by and/or usable with a recording and/or reproducing apparatus according to the first embodiment of the present invention when pits for the BCA are formed in a specific pattern and pits for the lead-in area are formed in a straight random pattern.
Figure 3B:
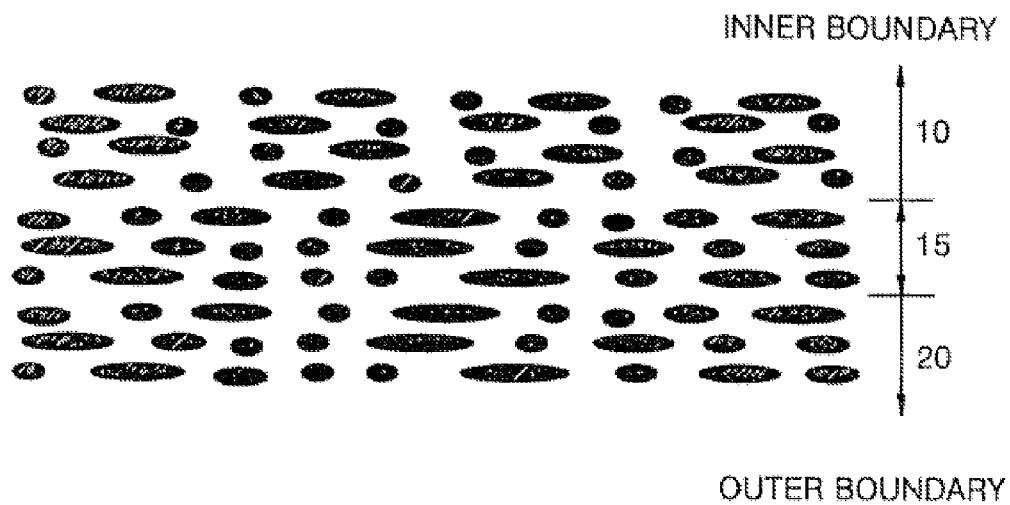
Figure 3C:
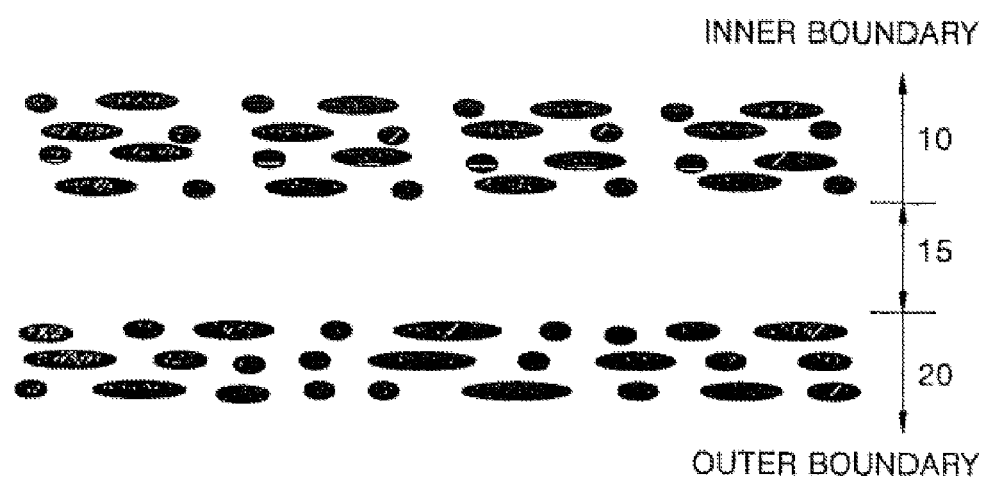
Figure 3D:
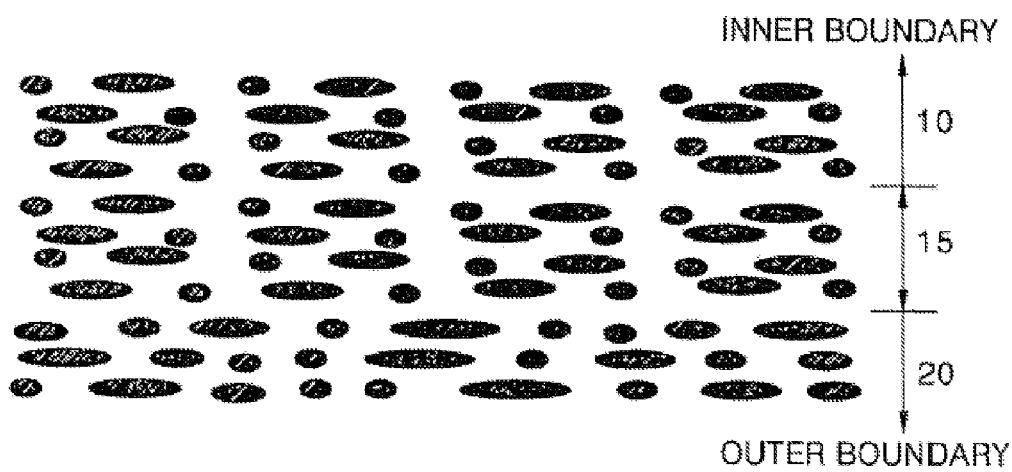
Figure 3E:
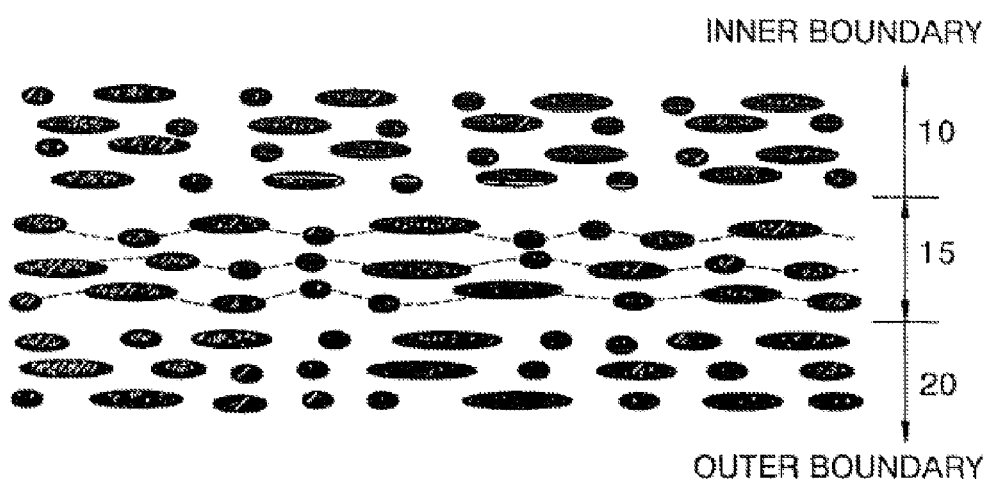

FIGS. 3A through 3E show examples of a pit pattern for the first transition area 15 between the BCA 10 and the lead-in area 20 when the BCA 10 is formed of a straight specific pattern of pits and the lead-in area 20 is formed of a straight random pattern of pits. Referring to FIG. 3A, the first transition area 15 is formed of a straight single pattern of pits. Referring to FIG. 3B, the first transition area 15 is formed of a straight random pattern of pits. Referring to FIG. 3C, the first transition area 15 is a mirror area. Referring to FIG. 3D, the first transition area 15 is formed of a straight specific pattern of pits. Referring to FIG. 3E, the first transition area 15 is formed of a wobbling random pattern of pits. Alternatively, the first transition area 15 may be formed of a wobbling single pattern of pits, a wobbling random pattern of pits, or a wobbling specific pattern of pits.

Figure 4A:
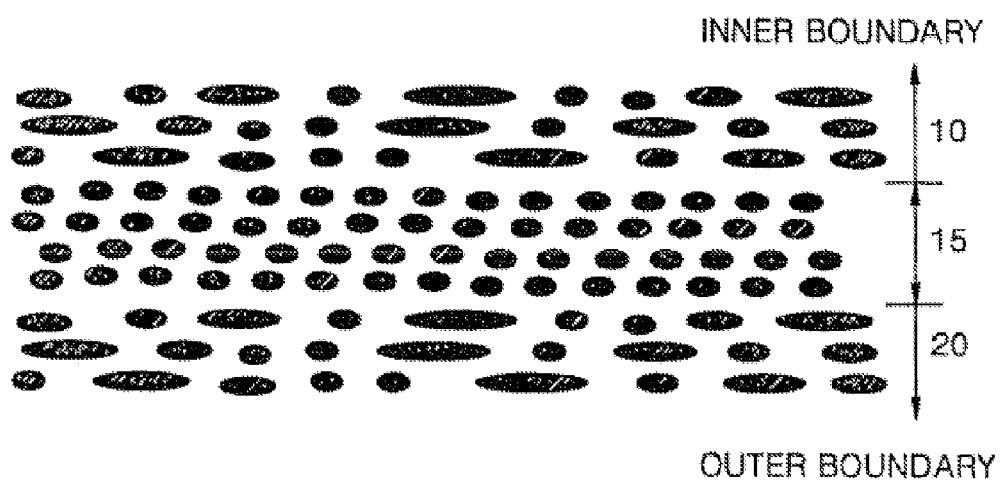
FIGS. 4A through 4E show examples of a pit pattern for a transition area between the BCA and the lead-in area of the optical information storage medium generated by and/or usable with a recording and/or reproducing apparatus according to the first embodiment of the present invention when pits for the BCA are formed in a random pattern and pits for the lead-in area are formed in a straight random pattern.
Figure 4B:
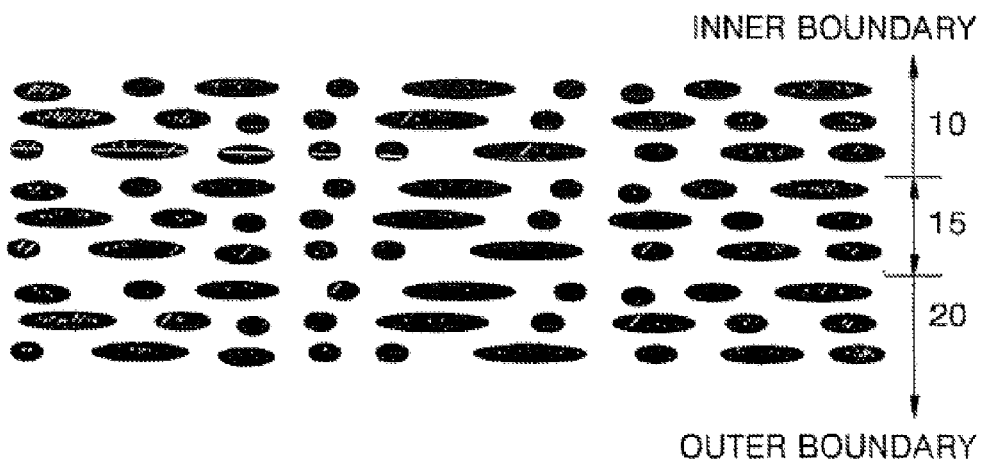
Figure 4C:
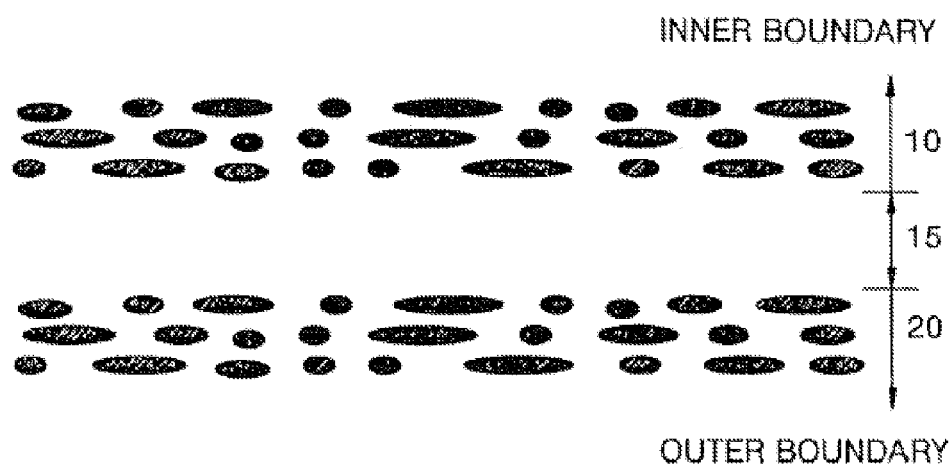
Figure 4D:
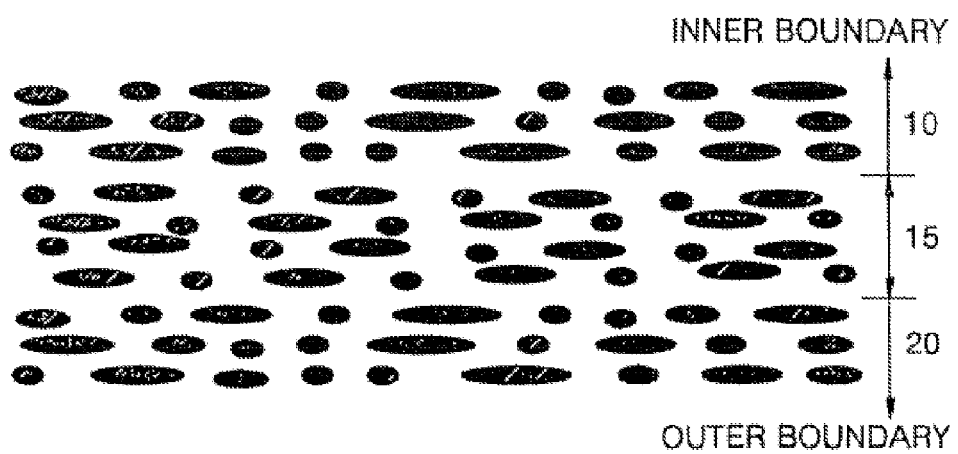
Figure 4E:
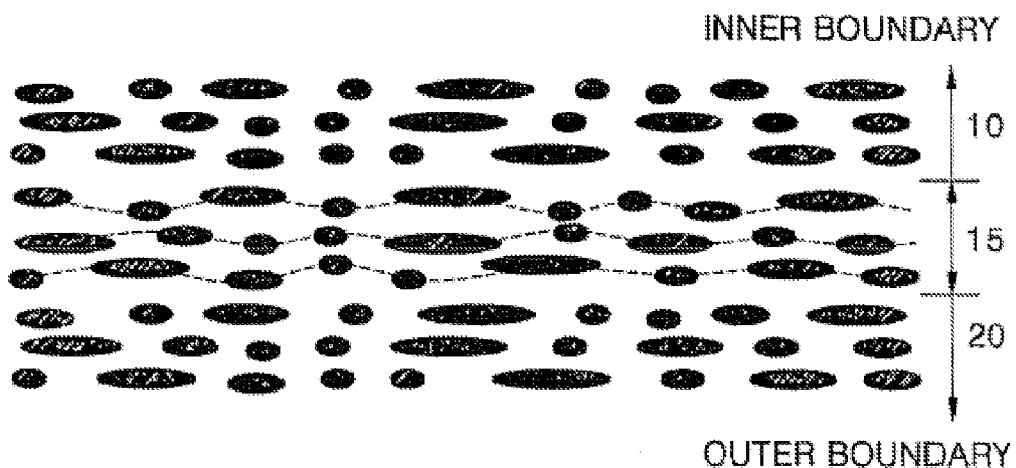

FIGS. 4A through 4E show examples of a pit pattern formed in the first transition area 15 between the BCA 10 and the lead-in area 20 when pits are formed in the BCA 10 in a straight random pattern and pits are formed in the lead-in area 20 in a straight random pattern. Referring to FIG. 4A, pits are formed in the first transition area 15 in a straight single pattern. Referring to FIG. 4B, pits are formed in the first transition area 15 in a straight random pattern. Referring to FIG. 4C, the first transition area 15 is a mirror area. Referring to FIG. 4D, pits are formed in the first transition area 15 in a straight specific pattern. Alternatively, pits may be formed in the first transition area 15 in a wobbling single pattern, a wobbling random pattern, or a wobbling specific pattern. Referring to FIG. 4E, the first transition area 15 is formed of a wobbling random pattern of pits. Although not shown, pits may be formed in the BCA 10 in a wobbling random pattern instead of a straight random pattern.

As described above, when pits are formed in the BCA 10 in a straight random pattern or in a wobbling random pattern, information containing a content, for example, 00h or BCA, is recordable in the BCA 10.

Although only the case where pits are formed in the BCA 10 in a straight pattern has been described above, the BCA 10 may be formed of a wobbling pattern of pits. For example, pits may be formed in the BCA 10 in a wobbling single pattern, in a wobbling specific pattern, or in a wobbling random pattern.

Pits may be formed in the BCA 10 in a straight pattern or a wobbling pattern and pits are formed in the lead-in area 20 in a wobbling pattern.

Figure 5A:
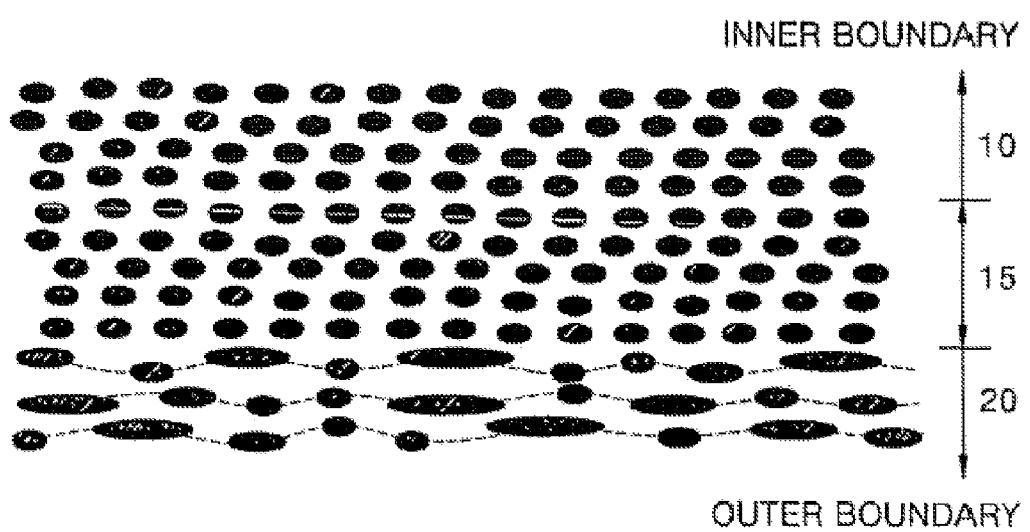
FIGS. 5A through 5E show examples of a pit pattern for a transition area between the BCA and the lead-in area of the optical information storage medium generated by and/or usable with a recording and/or reproducing apparatus according to the first embodiment of the present invention when pits for the BCA are formed in a single pattern and pits for the lead-in area are formed in a wobbling random pattern.
Figure 5B:
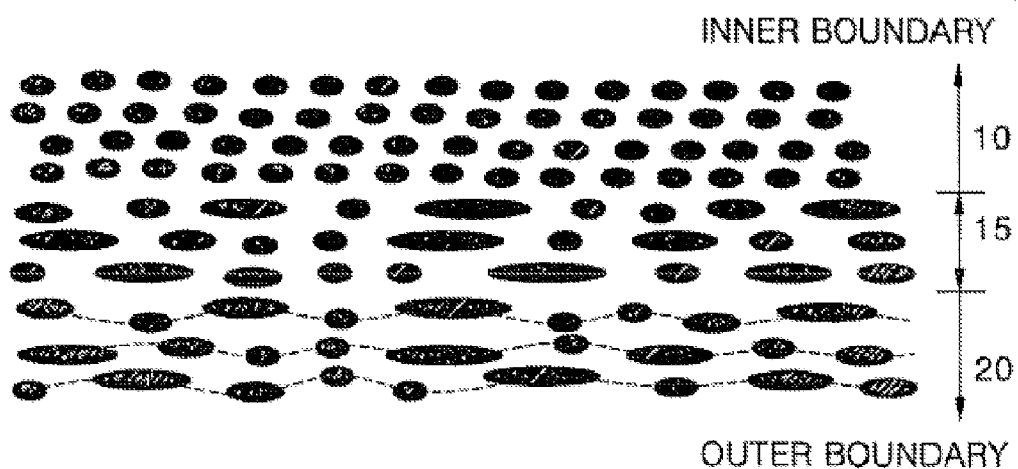
Figure 5C:
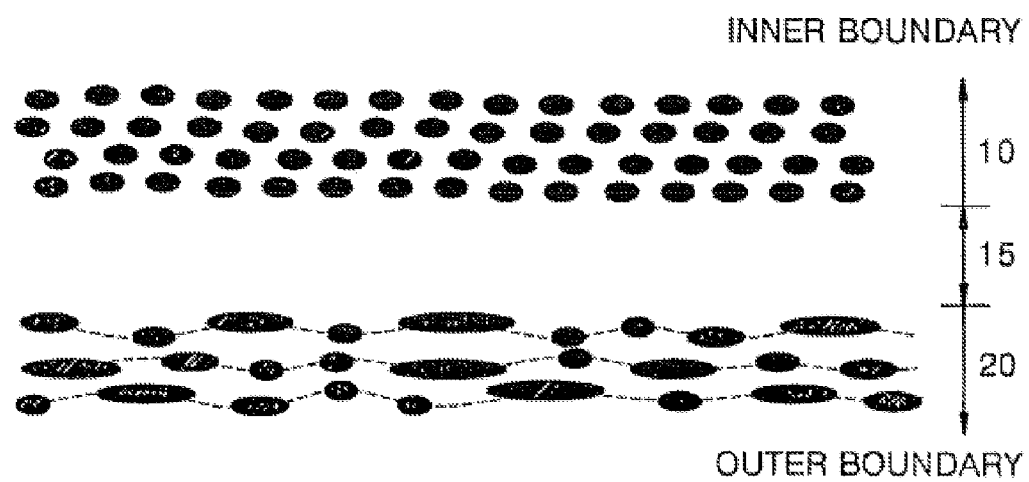
Figure 5D:
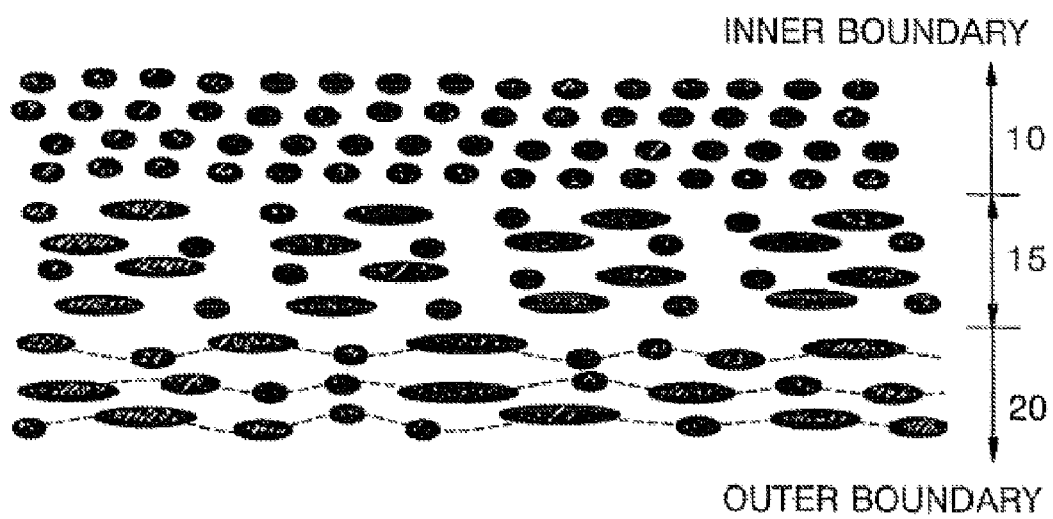

FIGS. 5A through 5E show examples of a pit pattern formed in the first transition area 15 between the BCA 10 and the lead-in area 20 when pits are formed in the BCA 10 in a straight single pattern and pits are formed in the lead-in area 20 in a wobbling random pattern. Referring to FIG. 5A, pits are formed in the first transition area 15 in a straight single pattern. Referring to FIG. 5B, pits are formed in the first transition area 15 in a straight random pattern. Referring to FIG. 5C, the first transition area 15 is a mirror area. Referring to FIG. 5D, pits are formed in the first transition area 15 in a straight specific pattern. Alternatively, pits may be formed in the first transition area 15 in a wobbling single pattern, a wobbling random pattern, or a wobbling specific pattern.

Figure 5E:
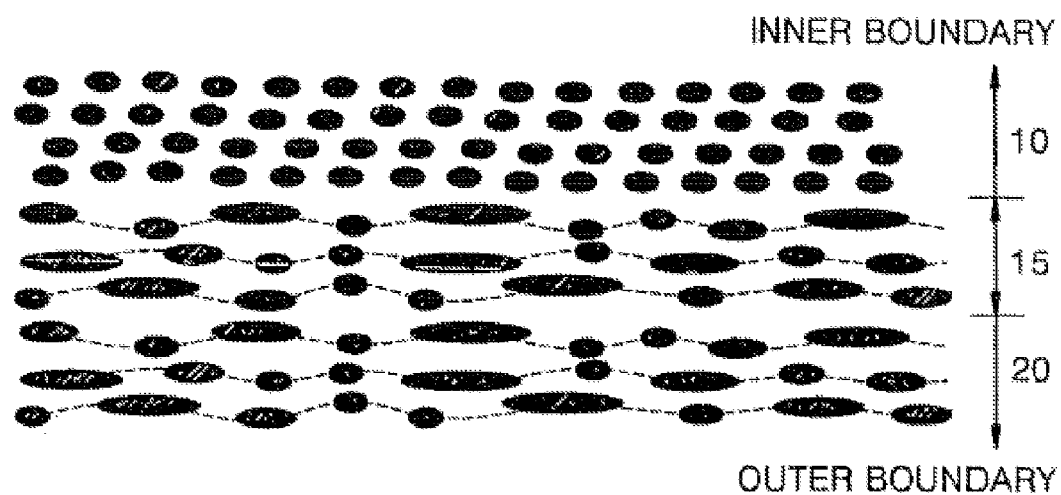

Referring to FIG. 5E, pits are formed in the first transition area 15 in a wobbling random pattern. Although FIGS. 5A through 5E show the BCA 10 where pits are formed in a straight single pattern, pits may be formed in the BCA 10 in a wobbling single pattern.

Figure 6A:
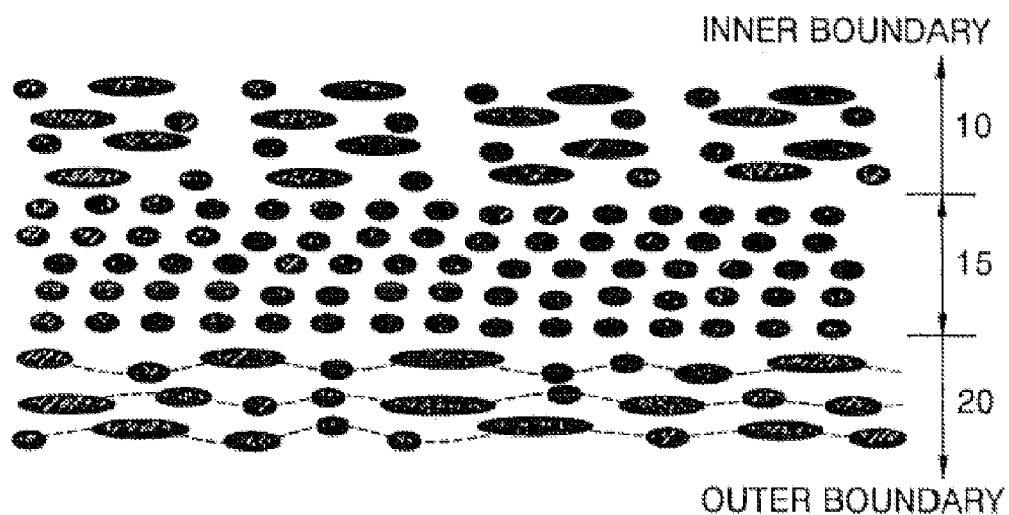
FIGS. 6A through 6E show examples of a pit pattern for a transition area between the BCA and the lead-in area of the optical information storage medium generated by and/or usable with a recording and/or reproducing apparatus according to the first embodiment of the present invention when pits for the BCA are formed in a specific pattern and pits for the lead-in area are formed in a wobbling random pattern.
Figure 6B:
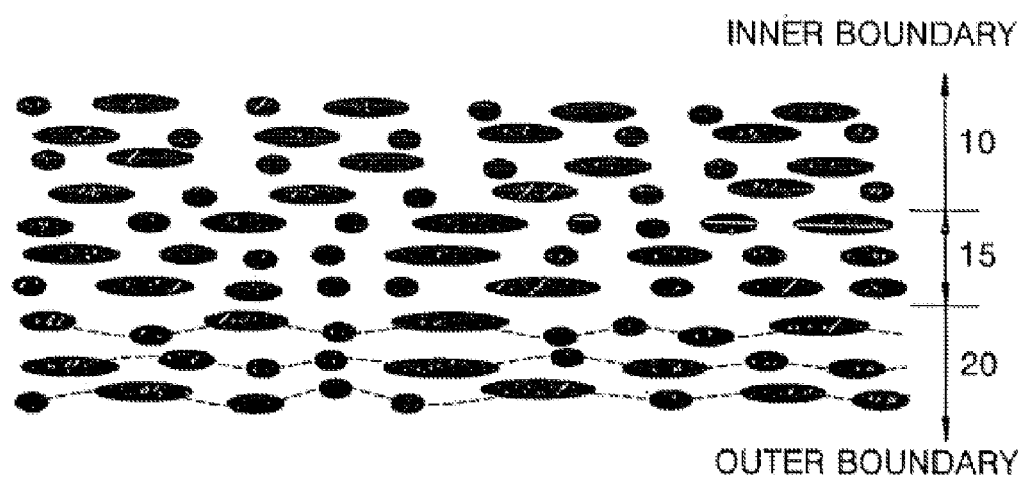
Figure 6C:
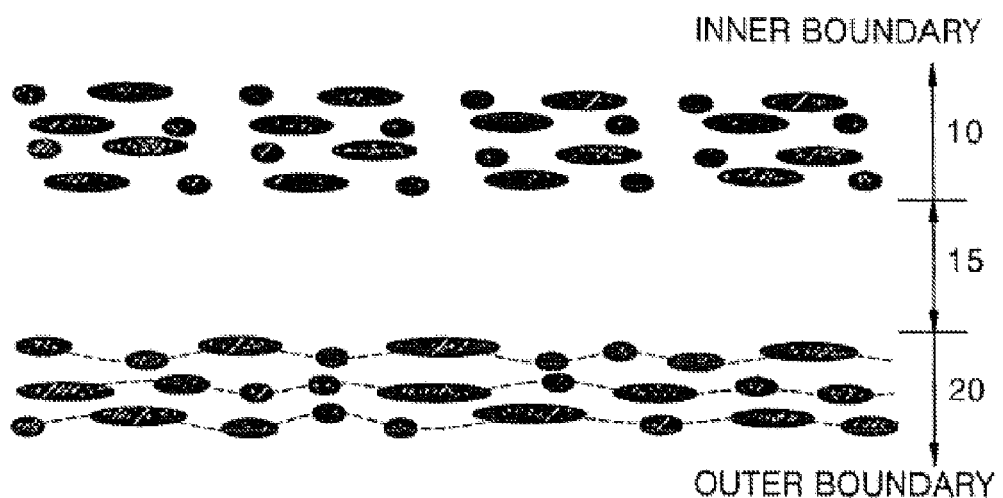
Figure 6D:
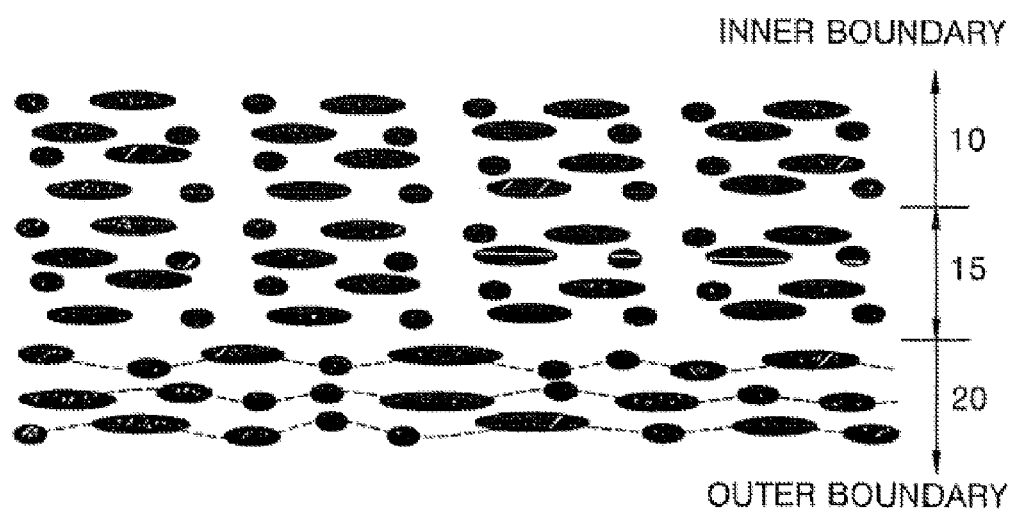
Figure 6E:
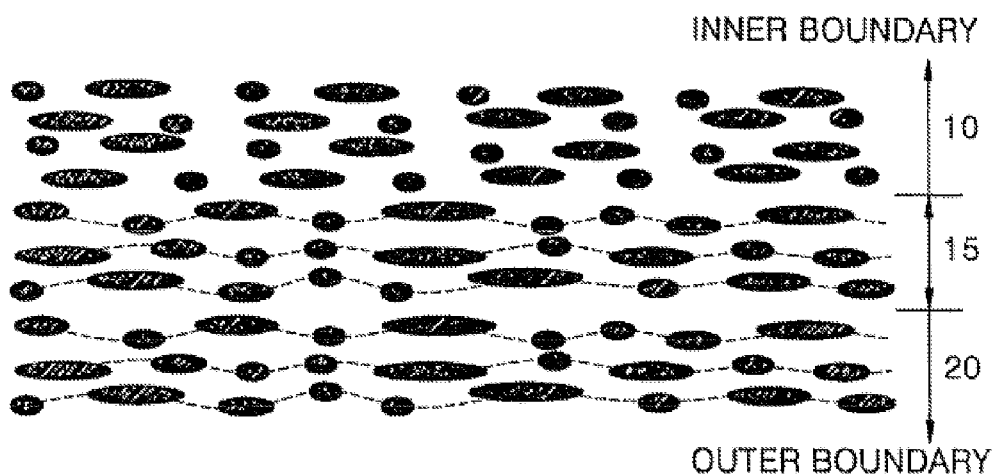

FIGS. 6A through 6E show examples of a pit pattern formed in the first transition area 15 when pits are formed in the BCA 10 in a straight specific pattern and pits are formed in the lead-in area 20 in a wobbling random pattern. Referring to FIG. 6A, pits are formed in the first transition area 15 in a straight single pattern. Referring to FIG. 6B, pits are formed in the first transition area 15 in a straight random pattern. Referring to FIG. 6C, the first transition area 15 is a mirror area. Referring to FIG. 6D, pits are formed in the first transition area 15 in a straight specific pattern. Alternatively, pits may be formed in the first transition area 15 in a wobbling single pattern, a wobbling random pattern, or a wobbling specific pattern. For example, FIG. 6E shows the first transition area 15 where pits are formed in a wobbling random pattern. Although FIGS. 6A through 6E show the BCA 10 where pits are formed in a straight specific pattern, pits may be formed in the BCA 10 in a wobbling specific pattern.

Figure 7A:
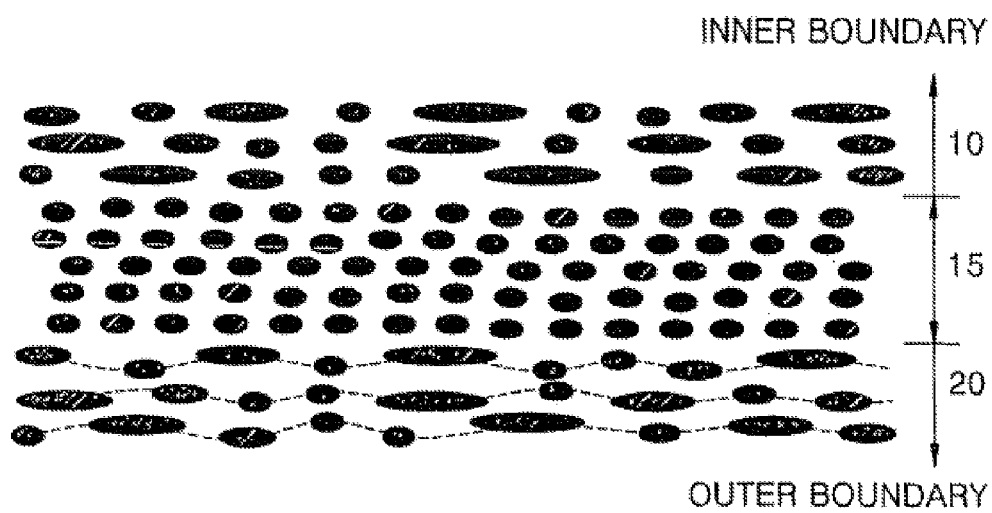
FIGS. 7A through 7F show examples of a pit pattern for a transition area between the BCA and the lead-in area of the optical information storage medium generated by and/or usable with a recording and/or reproducing apparatus according to the first embodiment of the present invention when pits for the BCA are formed in a random pattern and pits for the lead-in area are formed in a wobbling random pattern.
Figure 7B:
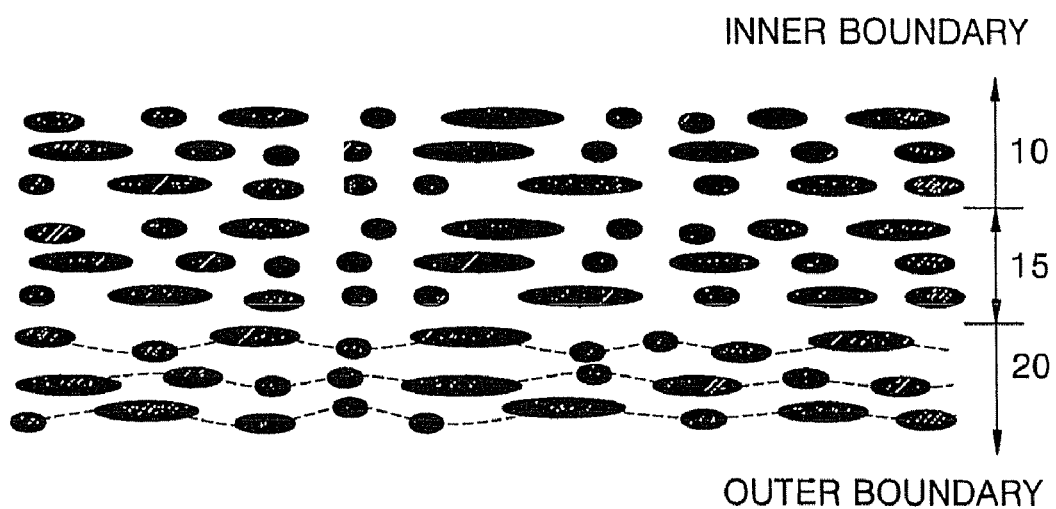
Figure 7C:
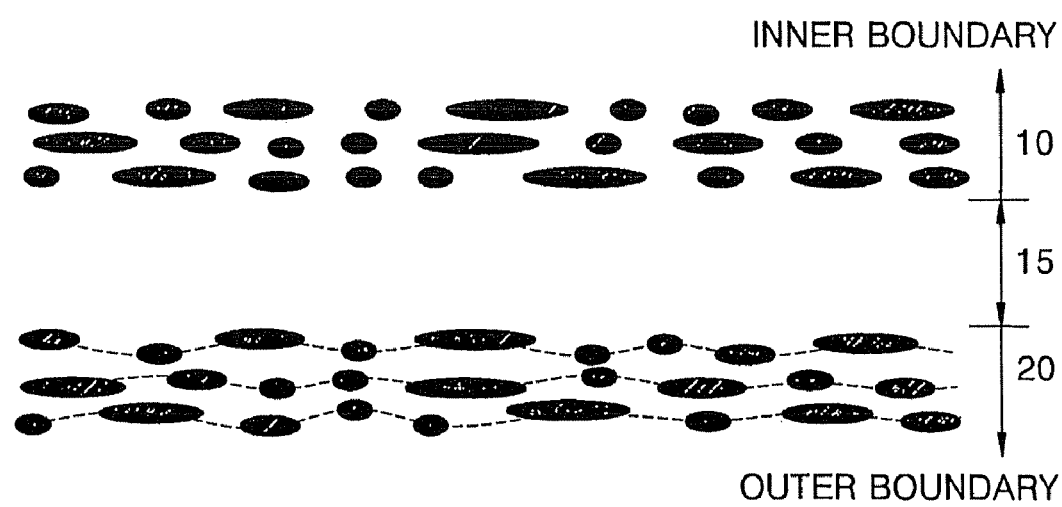
Figure 7D:
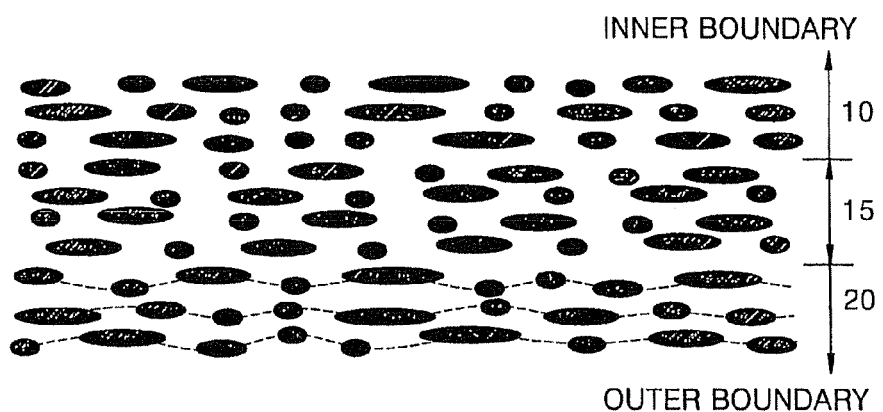
Figure 7E:
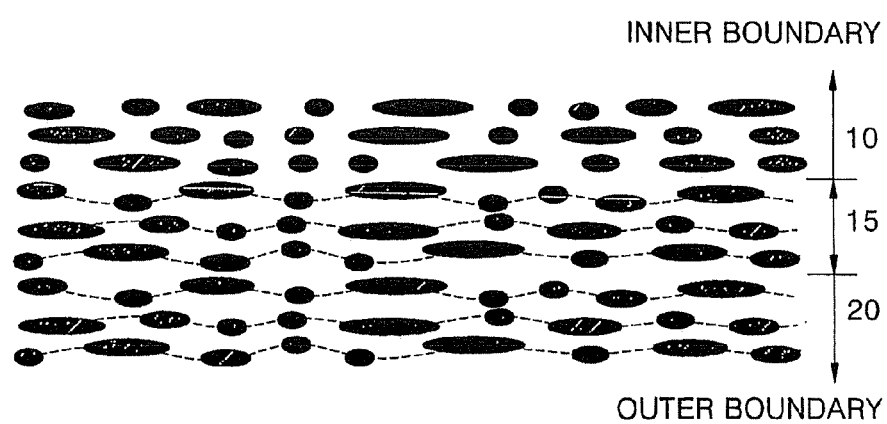

FIGS. 7A through 7F show examples of a pit pattern formed in the first transition area 15 when pits are formed in the BCA 10 in a straight random pattern and pits are formed in the lead-in area 20 are formed in a wobbling random pattern. Referring to FIG. 7A, pits are formed in the first transition area 15 in a straight single pattern. Referring to FIG. 7B, pits are formed in the first transition area 15 in a straight random pattern. Referring to FIG. 7C, the first transition area 15 is a mirror area. Referring to FIG. 7D, pits are formed in the first transition area 15 in a straight specific pattern. Alternatively, pits may be formed in the first transition area 15 in a wobbling single pattern, a wobbling random pattern, or a wobbling specific pattern. For example, FIG. 7E shows the first transition area 15 where pits are formed in a wobbling random pattern. Although FIGS. 7A through 7E show the BCA 10 where pits are formed in a straight random pattern, pits may be formed in the BCA 10 in a wobbling random pattern. When pits are formed in the BCA 10 in a straight random pattern or a wobbling random pattern as described above, information containing a content, such as, 00h or BCA, is recordable in the BCA 10.

Figure 7F:
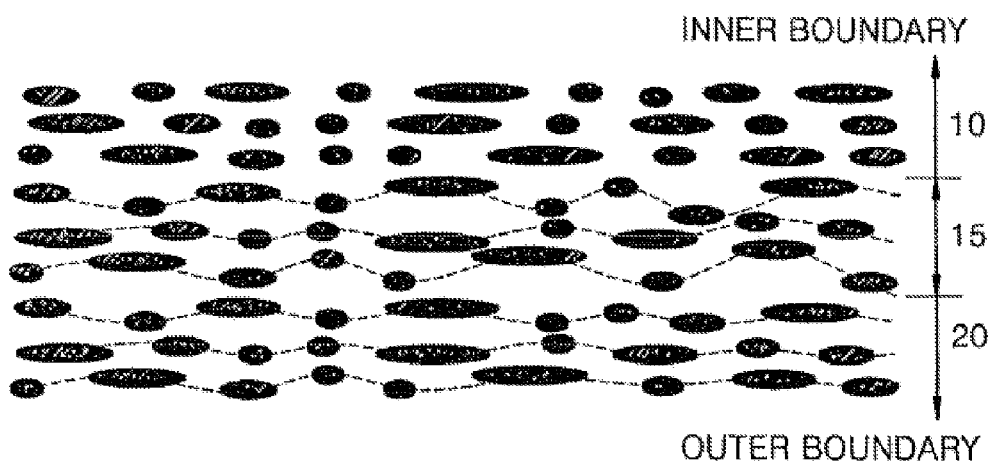

When pits are formed in the BCA 10, the first transition area 15, or the lead-in area 20 in a wobbling pattern, they are formed so that the amplitude of a wobble gradually increases or decreases. As shown in FIG. 7F, the pits are formed in the first transition area 15 in a wobbling pattern so that the amplitude of a wobble can gradually increase.

The BCA 10, the first transition area 15, and the lead-in area 20 may have either an identical track pitch or different track pitches. For example, the BCA 10 and the first transition area 15 have the same track pitch, and only the lead-in area 20 has a different track pitch. Alternatively, the first transition area 15 and the lead-in area 20 may have the same track pitch, and only the BCA 10 has a different track pitch. When the BCA 10 and the lead-in area 20 have different track pitches, the first transition area 15 is formable so that its track pitch can gradually increase or decrease. For example, when a track pitch for the BCA 10 is "a" and a track pitch for the lead-in area 20 is "b" (b>a), the first transition area 15 is formed so that its track pitch can gradually increase from "a" to "b".

An optical information storage medium generated by and/or usable with a recording and/or reproducing apparatus according to a second embodiment of the present invention includes the BCA 10, the lead-in area 20, the user data area 30, and the lead-out area 40. A second transition area 25 is further included between the lead-in area 20 and the user data area 30.

Hereinafter, a pit pattern formed in each of the lead-in area 20, the second transition area 25, and the user data area 30 will be described with reference to FIGS. 8A through 10F. When pits are formed in the lead-in area 20 in a third straight pattern and pits are formed in the user data area 30 in a fourth straight pattern, the second transition area 25 are formable of a straight single pattern of pits, a straight specific pattern of pits, a straight random pattern of pits, a wobbling single pattern of pits, a wobbling specific pattern of pits, or a wobbling random pattern of pits. Alternatively, the second transition area 25 can be a mirror area.

Each of the third and fourth straight patterns may be one of the straight single pattern, the straight specific pattern, and the straight random pattern.

Figure 8A:
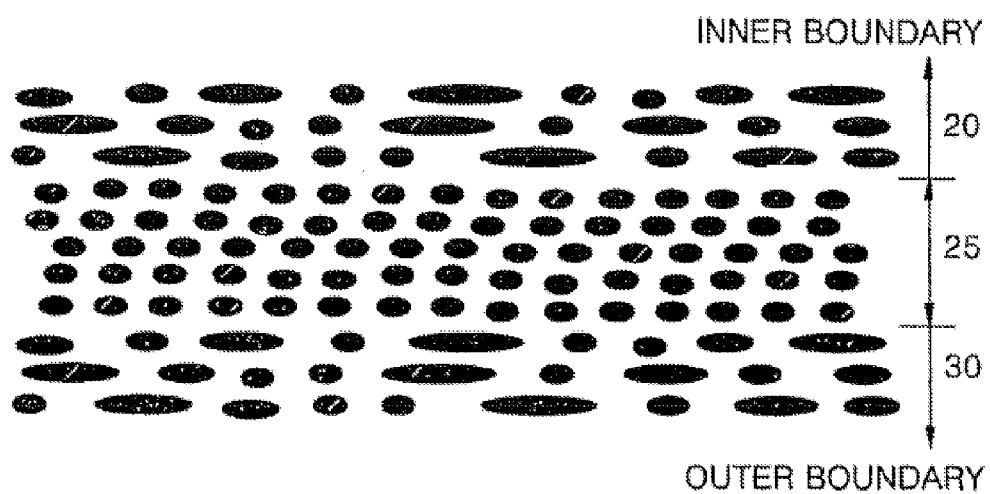
FIGS. 8A through 8F show examples of a pit pattern for a transition area between a lead-in area and a user data area of an optical information storage medium generated by and/or usable with a recording and/or reproducing apparatus according to a second embodiment of the present invention when pits for the lead-in area are formed in a straight random pattern and pits for the user data area are formed in a straight random pattern.
Figure 8B:
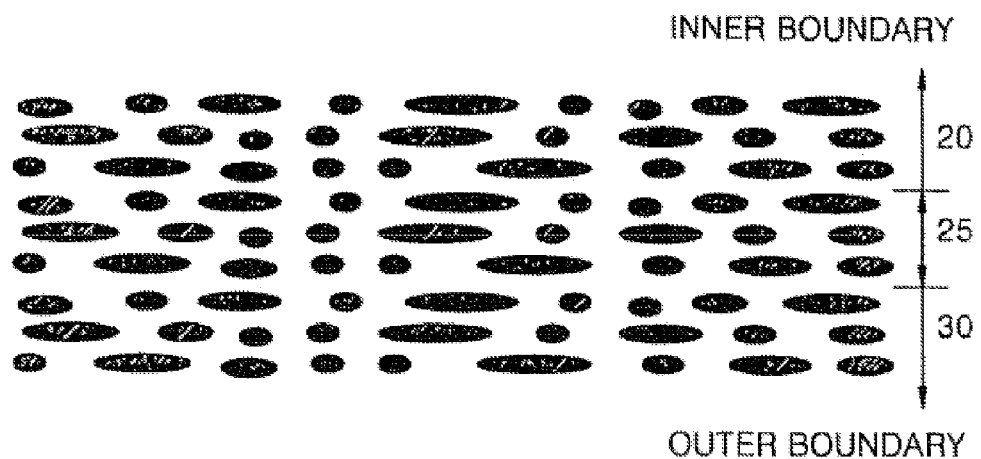
Figure 8C:
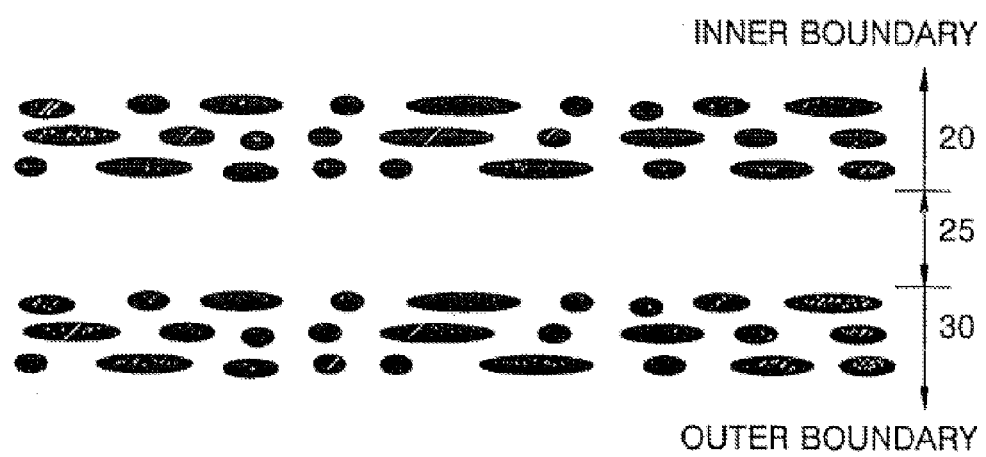
Figure 8D:
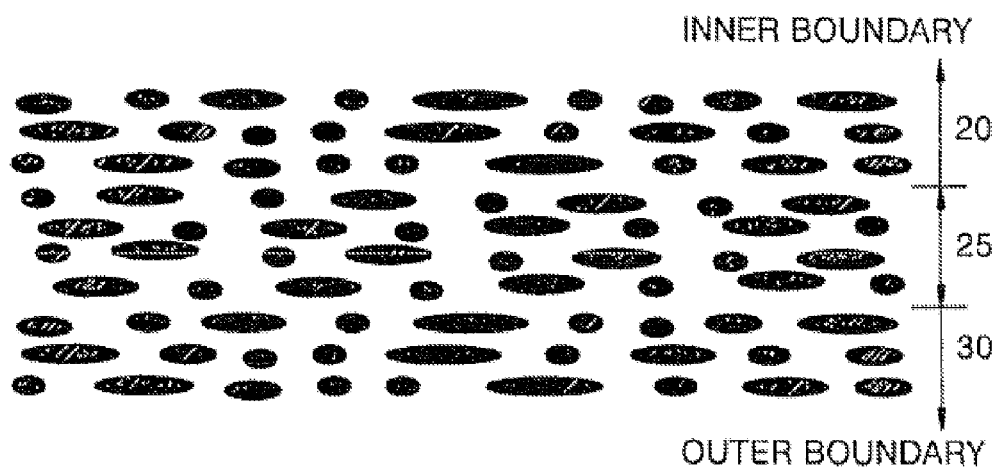
Figure 8E:
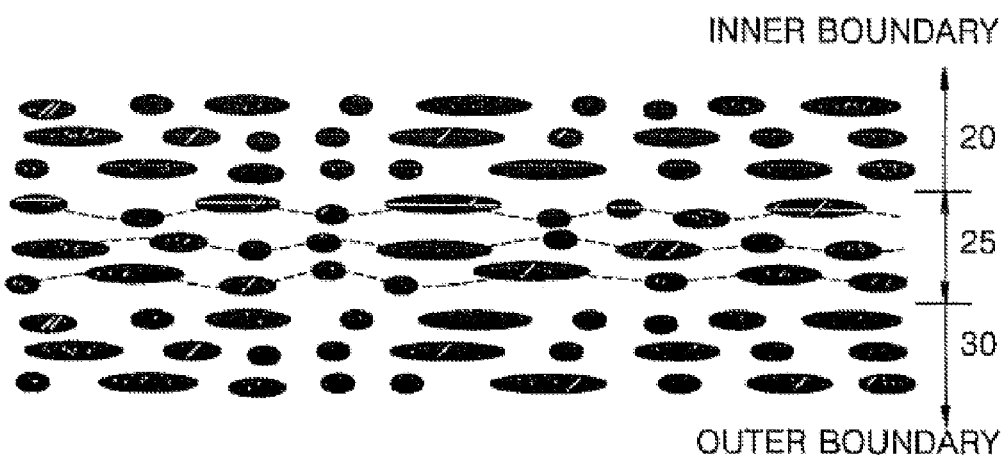

FIGS. 8A through 8F show examples of a pit pattern formed in the second transition area 25 when pits are formed in the lead-in area 20 in a straight random pattern and pits are formed in the user data area 30 in a straight random pattern. Referring to FIG. 8A, pits are formed in the second transition area 25 in a straight single pattern. Referring to FIG. 8B, pits are formed in the second transition area 25 in a straight random pattern. Referring to FIG. 8C, the second transition area 25 is a mirror area. Referring to FIG. 8D, pits are formed in the second transition area 25 in a straight specific pattern. Alternatively, pits may be formed in the second transition area 25 in a wobbling single pattern, a wobbling random pattern, or a wobbling specific pattern. For example, FIG. 8E shows the second transition area 25 where pits are formed in a wobbling random pattern.

Figure 8F:
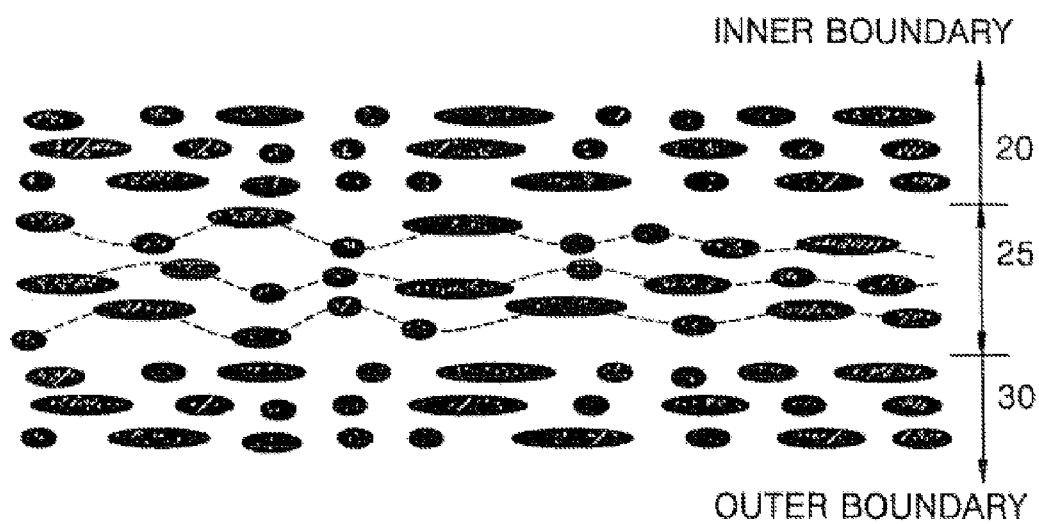

When pits are formed in the second transition area 25 in a wobbling pattern, they are formable so that the amplitude of a wobble can gradually decrease as shown in FIG. 8F.

A pit pattern formed in the second transition area 25 when the lead-in area 25 is formed of a wobbling pattern of pits and the user data area 30 is formed of a straight pattern of pits will now be described. To be more specific, pits may be formed in the lead-in area 20 in a wobbling single pattern, a wobbling specific pattern, or a wobbling random pattern, and pits may be formed in the user data area 30 in a straight single pattern, a straight specific pattern, or a straight random pattern.

Figure 9A:
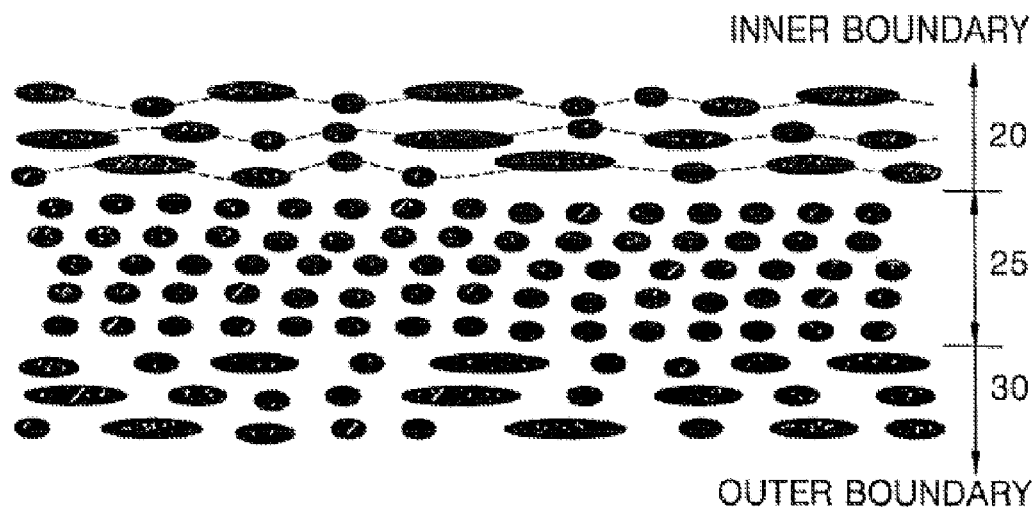
FIGS. 9A through 9F show a pit pattern for a transition area between the lead-in area and the user data area of the optical information storage medium generated by and/or usable with a recording and/or reproducing apparatus according to the second embodiment of the present invention when pits for the lead-in area are formed in a wobbling random pattern and pits for the user data area are formed in a straight random pattern.
Figure 9B:
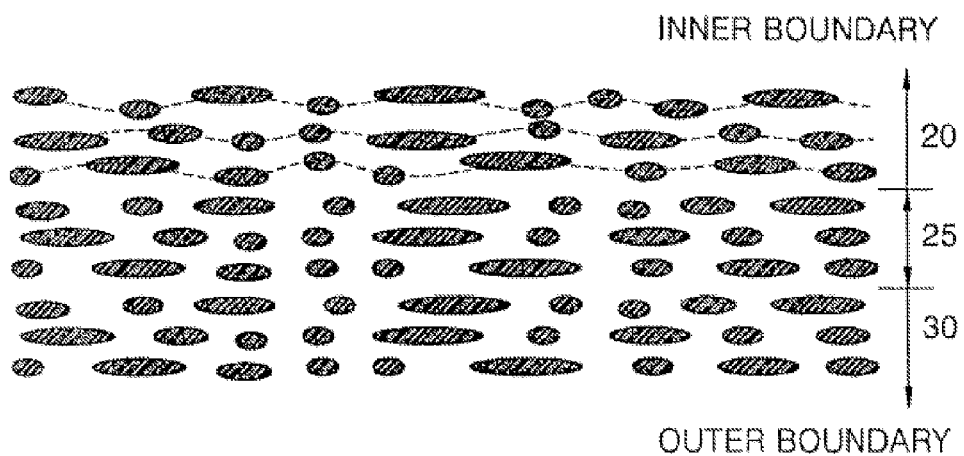
Figure 9C:
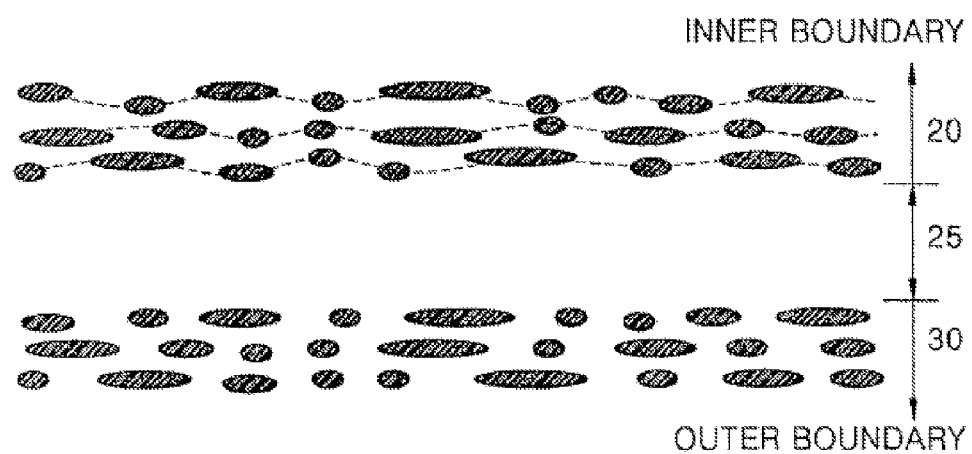
Figure 9D:
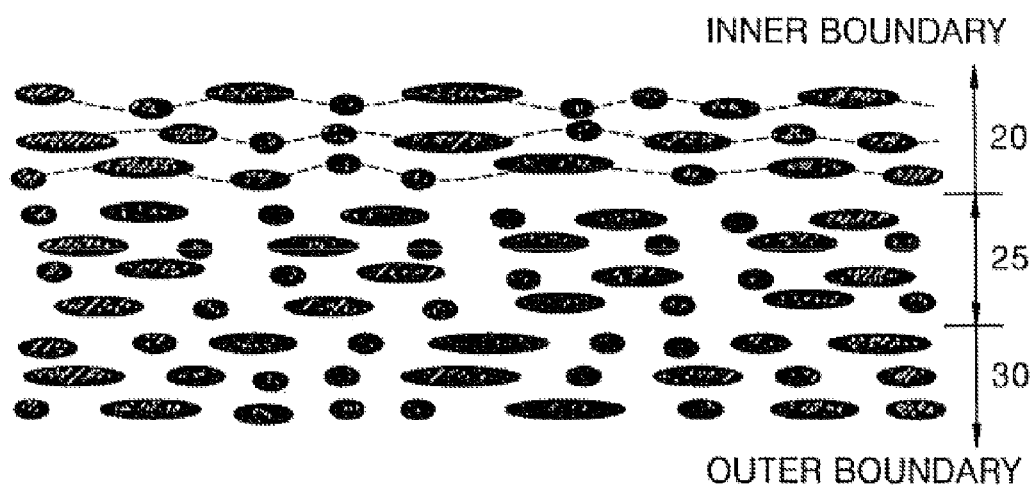
Figure 9E:
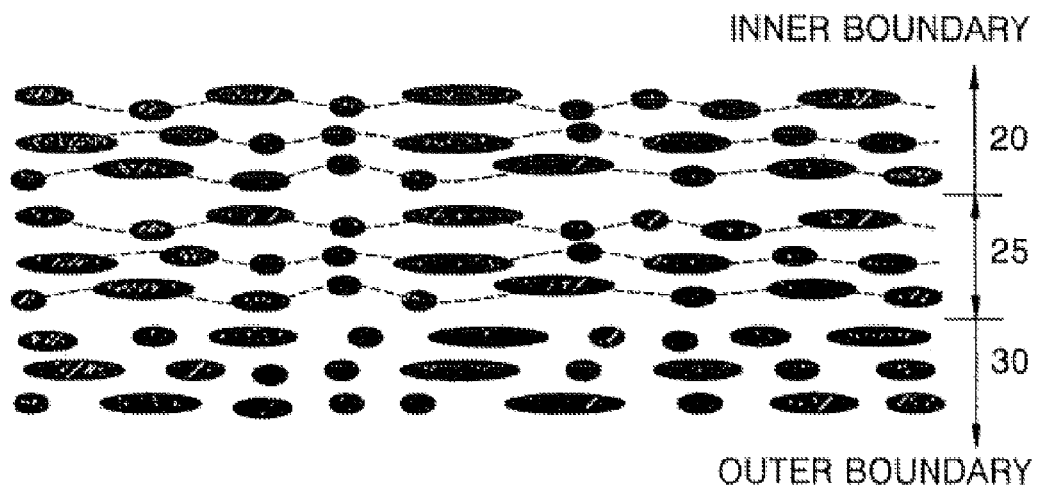

FIGS. 9A through 9F show examples of a pit pattern formed in the second transition area 25 when the lead-in area 20 and the user data area 30 are formed of pits to have a wobbling random pattern and a straight random pattern, respectively. Referring to FIG. 9A, pits are formed in the second transition area 25 in a straight single pattern. Referring to FIG. 9B, pits are formed in the second transition area 25 in a straight random pattern. Referring to FIG. 9C, the second transition area 25 is a mirror area. Referring to FIG. 9D, pits are formed in the second transition area 25 in a straight specific pattern. Alternatively, pits may be formed in the second transition area 25 in a wobbling single pattern, a wobbling random pattern, or a wobbling specific pattern. For example, FIG. 9E shows the second transition area 25 where pits are formed in a wobbling random pattern.

Figure 9F:
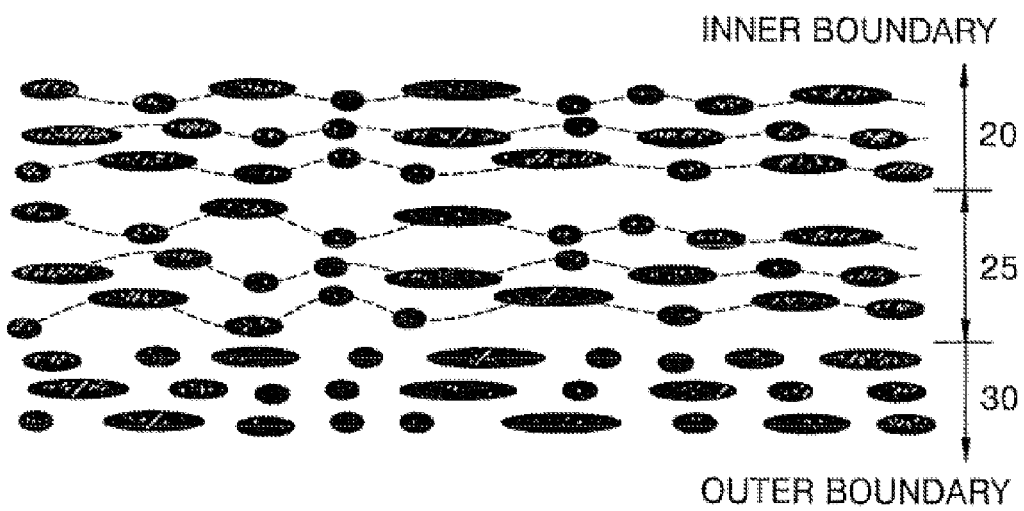

When pits are formed in the second transition area 25 in a wobbling pattern, they are formable so that the amplitude of a wobble can gradually decrease as shown in FIG. 9F.

Examples of a pit pattern formed in the second transition area 25 when the lead-in area 20 and the user data area 30 are formed of a straight pattern of pits and a wobbling pattern of pits, respectively, will now be described. To be more specific, pits may be formed in the lead-in area 20 in a straight single pattern, a straight specific pattern, or a straight random pattern, and pits may be formed in the user data area 30 in a wobbling single pattern, a wobbling specific pattern, or a wobbling random pattern.

Figure 10A:
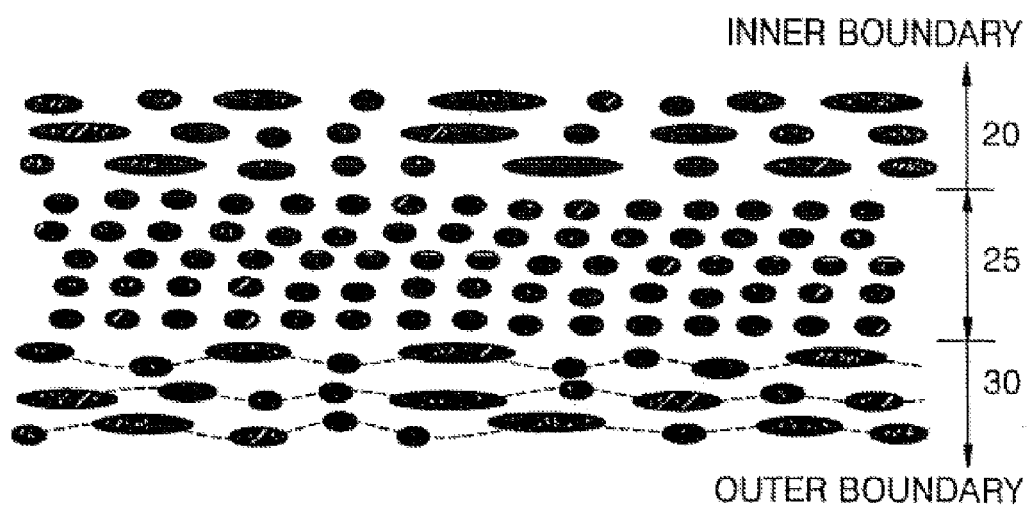
FIGS. 10A through 10F show examples of a pit pattern for a transition area between the lead-in area and the user data area of the optical information storage medium generated by and/or usable with a recording and/or reproducing apparatus according to the second embodiment of the present invention when pits for the lead-in area are formed in a straight random pattern and pits for the user data area are formed in a wobbling random pattern.
Figure 10B:
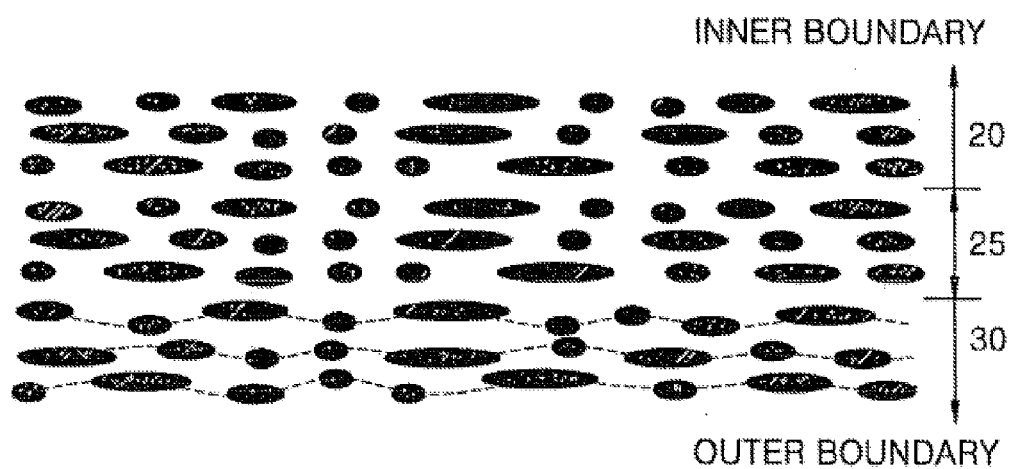
Figure 10C:
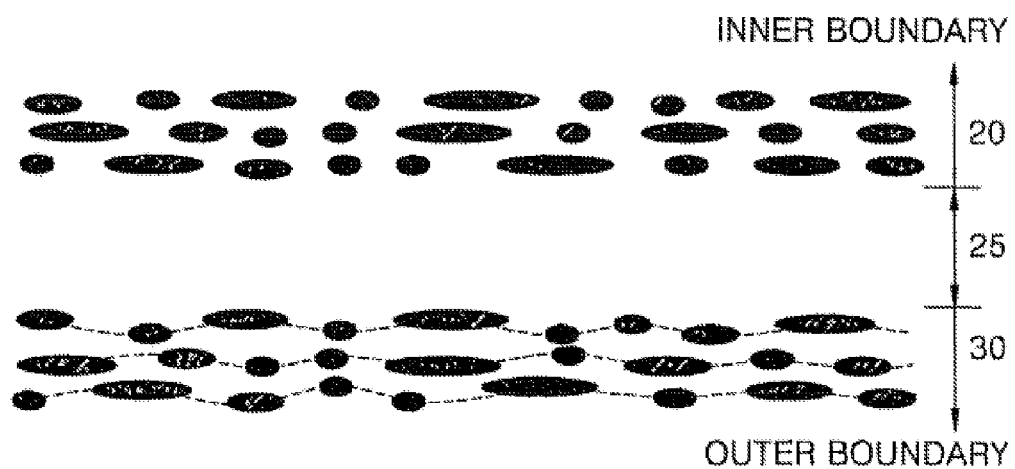
Figure 10D:
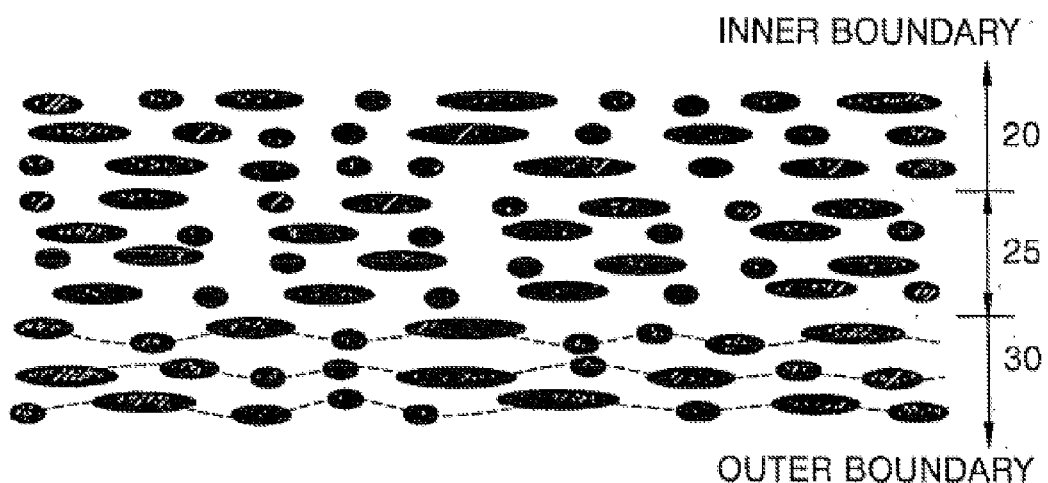
Figure 10E:
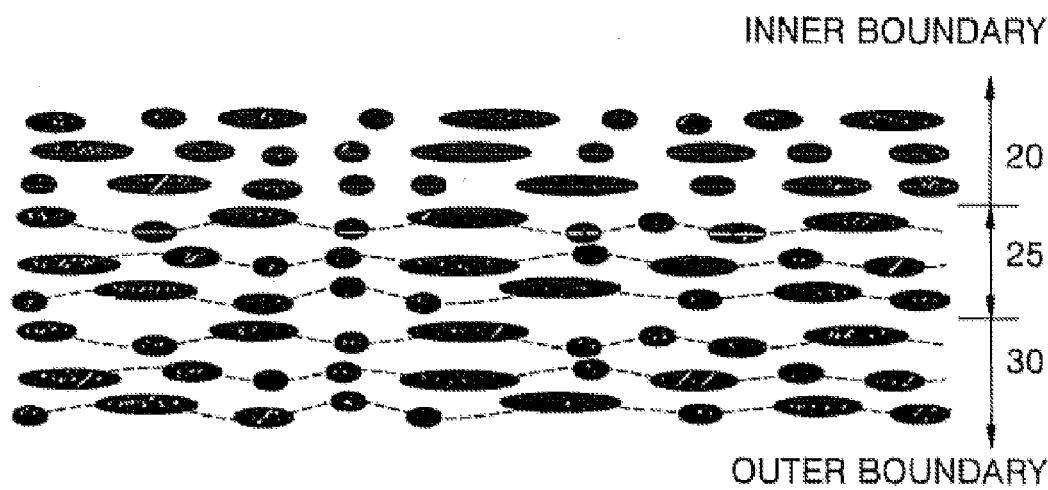

FIGS. 10A through 10F show examples of a pit pattern formed in the second transition area 25 when the lead-in area 20 and the user data area 30 are formed of pits to have a straight random pattern and a wobbling random pattern, respectively. Referring to FIG. 10A, pits are formed in the second transition area 25 in a straight single pattern. Referring to FIG. 10B, pits are formed in the second transition area 25 in a straight random pattern. Referring to FIG. 1C, the second transition area 25 is a mirror area. Referring to FIG. 10D, pits are formed in the second transition area 25 in a straight specific pattern. Alternatively, pits may be formed in the second transition area 25 in a wobbling single pattern, a wobbling random pattern, or a wobbling specific pattern. For example, FIG. 10E shows the second transition area 25 where pits are formed in a wobbling random pattern.

Figure 10F:
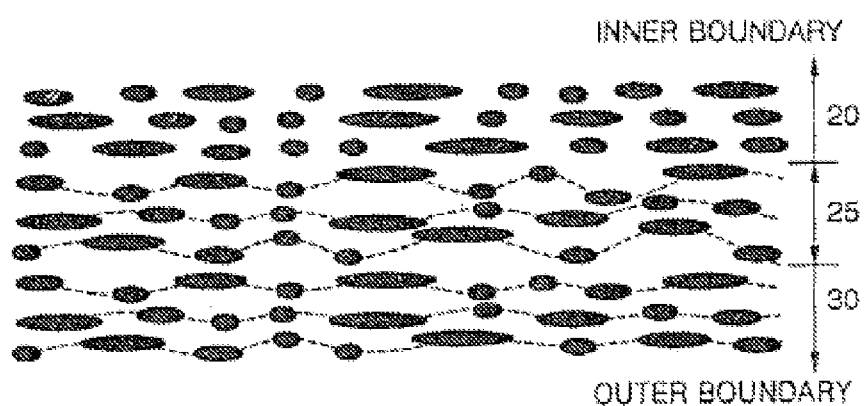

When pits are formed in the second transition area 25 in a wobbling pattern, they are formable so that the amplitude of a wobble can gradually increase as shown in FIG. 10F.

When the lead-in area 20 and the user data area 30 are formed of pits to have a wobbling pattern, the second transition area 25 included therebetween is formable of a straight single pattern of pits, a straight specific pattern of pits, a straight random pattern of pits, a wobbling single pattern of pits, a wobbling specific pattern of pits, or a wobbling random pattern of pits. Alternatively, the second transition area 25 can be a mirror area.

When pits are formed in the lead-in area 20, the second transition area 25, or the user data area 30 in a wobbling pattern, they are formable so that the amplitude of a wobble gradually increases or decreases.

The lead-in area 20, the second transition area 25, and the user data area 30 may have either an identical track pitch or different track pitches. For example, the lead-in area 20 and the second transition area 25 have the same track pitch, and only the user data area 30 has a different track pitch. Alternatively, the second transition area 25 and the user data area 30 may have the same track pitch, and only the lead-in area 20 has a different track pitch. When the lead-in area 20 and the user data area 30 have different track pitches, the second transition area 25 is formable so that its track pitch can gradually increase or decrease. For example, when a track pitch for the lead-in area 20 is "c" and a track pitch for the user data area 30 is "d" (d>c), the second transition area 25 is formed so that its track pitch can gradually increase from "c" to "d".

Figure 11:
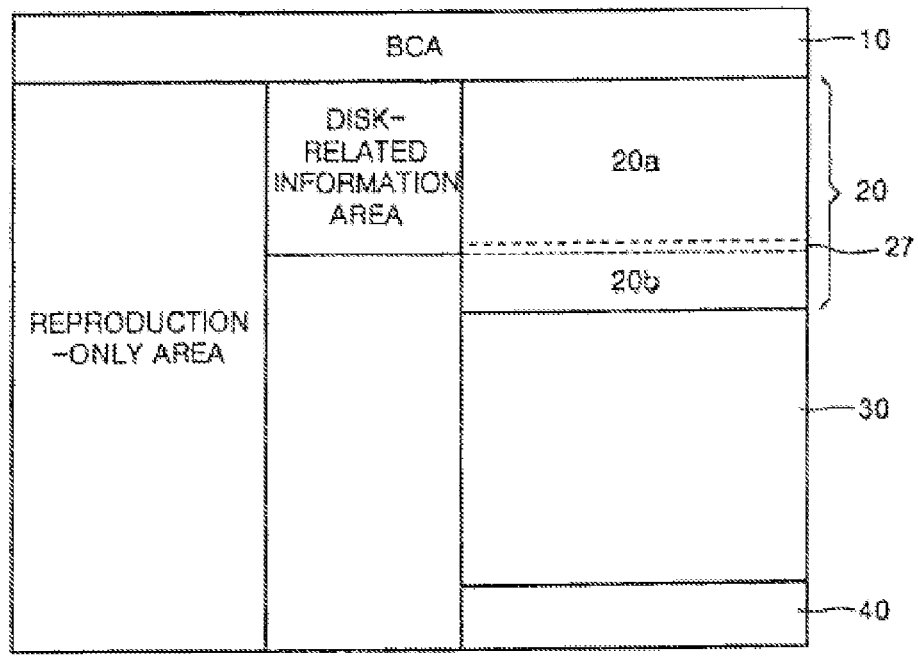
FIG. 11 shows a physical structure of an optical information storage medium generated by and/or usable with a recording and/or reproducing apparatus according to a third embodiment of the present invention.

An optical information storage medium generated by and/or usable with a recording and/or reproducing apparatus according to a third embodiment of the present invention is divided into a plurality of areas, at least one of which is divided into a plurality of sub-areas according to function. A third transition area is included between two adjacent sub-areas. Referring to FIG. 11, the optical information storage medium according to the third embodiment of the present invention includes the BCA 10, the lead-in area 20, the user data area 30, and the lead-out area 40. The lead-in area 20 includes first and second sub-areas 20a and 20b, respectively.

A transition area may be included both between the BCA 10 and the lead-in area 20 and between the lead-in area 20 and the user data area 30. The principle of the first and second transition areas of the first and second embodiments is equally applied to these transition areas.

A third transition area 27 is included between the first and second sub-areas 20a and 20b of the lead-in area 20. Hereinafter, a pit pattern formed in each of the first and second sub-areas 20a and 20b and the third transition area 27 will be described in greater detail. The first and second sub-areas 20a and 20b are formed of pits in a straight pattern and a wobbling pattern, respectively. The straight pattern may be a straight single pattern, a straight specific pattern, or a straight random pattern, and the wobbling pattern may be a wobbling single pattern, a wobbling specific pattern, or a wobbling random pattern.

The third transition area 27 formed between the first and second sub-areas 20a and 20b when the first and second sub-areas 20a and 20b are formed of pits to have a straight pattern and a wobbling pattern, respectively, will now be described.

Figure 12A:
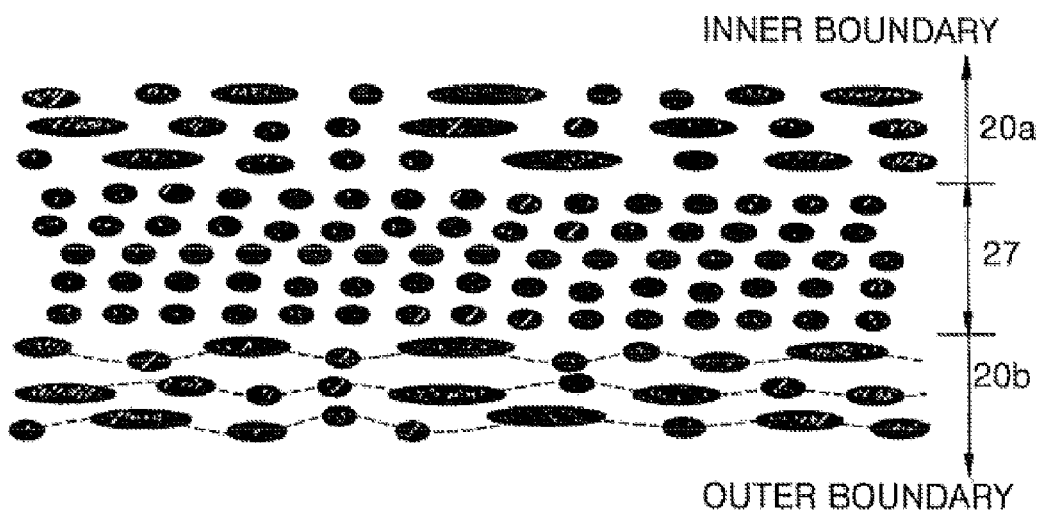
FIGS. 12A through 12F show examples of a pit pattern for a transition area between a BCA and a lead-in area of the optical information storage medium generated by and/or usable with a recording and/or reproducing apparatus according to the third embodiment of the present invention when pits for a first area of the lead-in area are formed in a random pattern and pits for a second area of the lead-in area are formed in a wobbling random pattern.
Figure 12B:
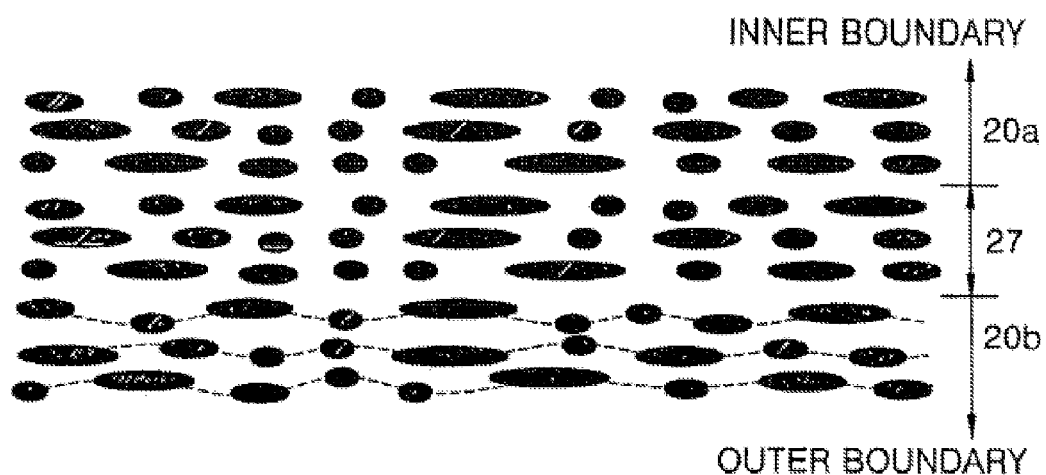
Figure 12C:
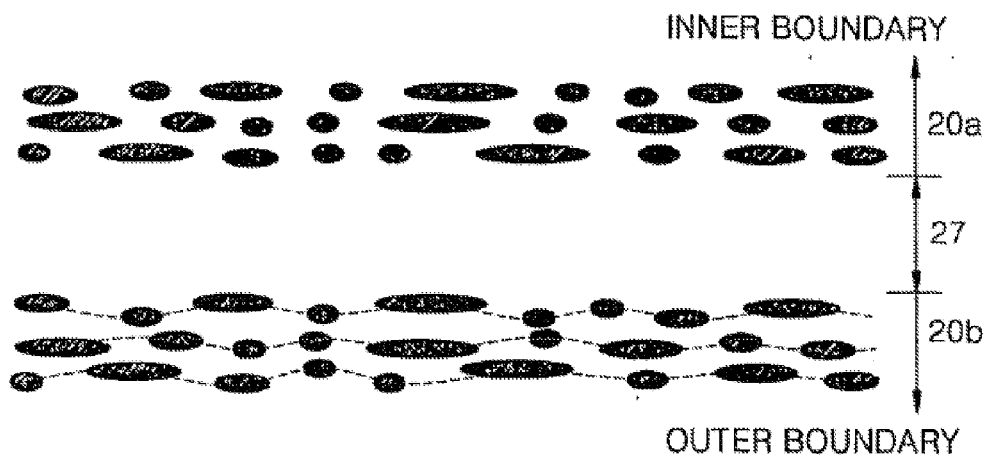
Figure 12D:
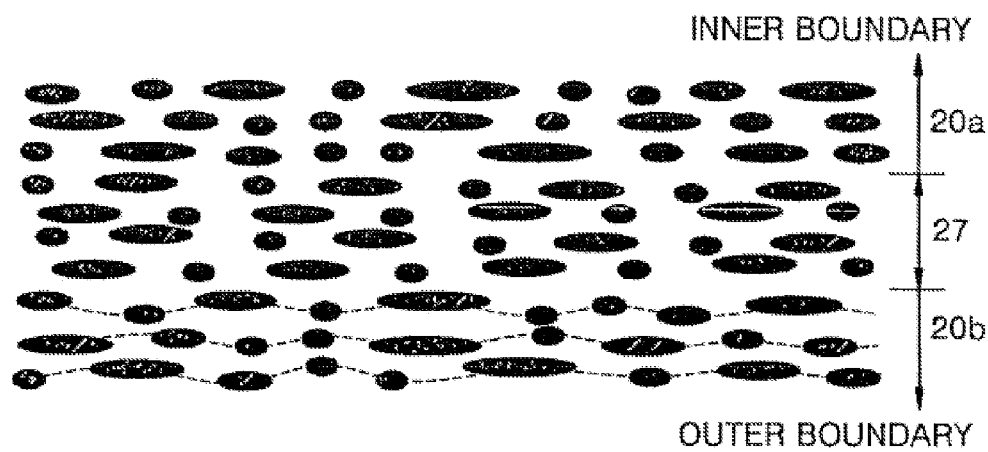
Figure 12E:
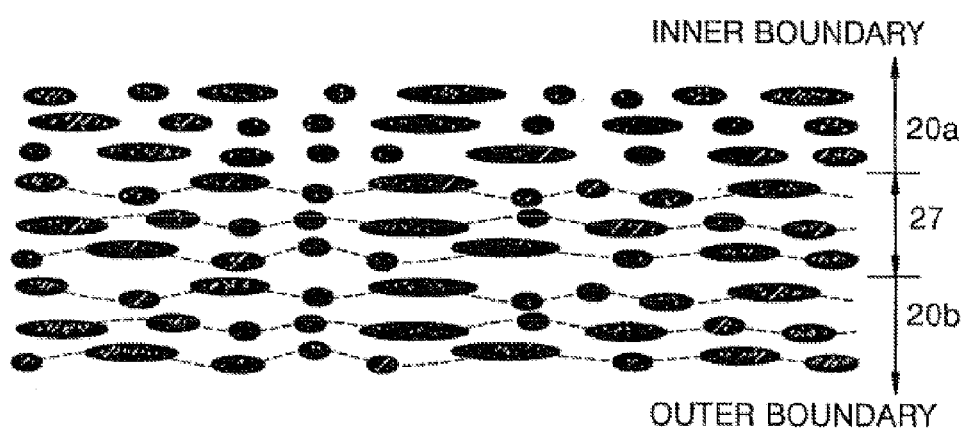
Figure 12F:
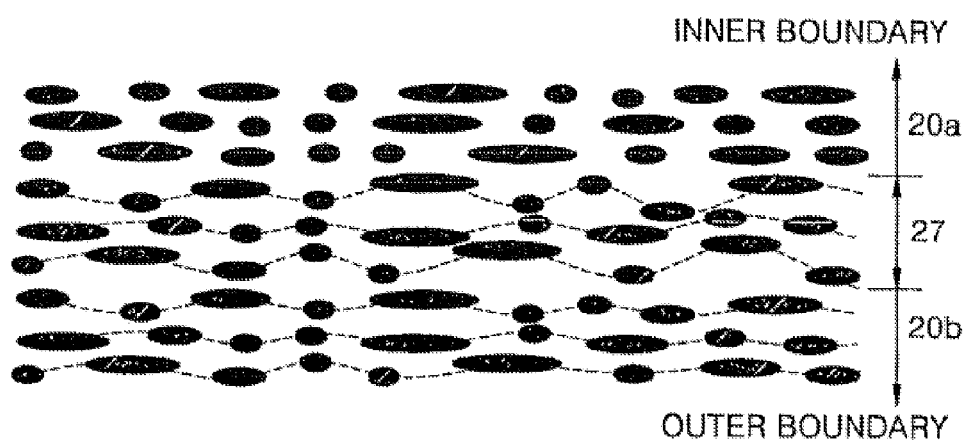

FIGS. 12A through 12F show examples of a pit pattern for the third transition area 27 when the first and second sub-areas 20a and 20b are formed of pits to have a straight random pattern and a wobbling random pattern, respectively. Referring to FIG. 12A, pits are formed in the third transition area 27 in a straight single pattern. Referring to FIG. 12B, pits are formed in the third transition area 27 in a straight random pattern. Referring to FIG. 12C, the third transition area 27 is a mirror area. Referring to FIG. 12D, pits are formed in the third transition area 27 in a straight specific pattern. Alternatively, pits may be formed in the third transition area 27 in a wobbling single pattern, a wobbling random pattern, or a wobbling specific pattern. For example, FIG. 12E shows the third transition area 27 where pits are formed in a wobbling random pattern. When pits are formed in the third transition area 27 in a wobbling pattern, they are formable so that the amplitude of a wobble can gradually increase or decrease. For example, the third transition area 27 is formable of a wobbling random pattern of pits so that the amplitude of a wobble can gradually increase as shown in FIG. 12F.

When the first and second sub-areas 20a and 20b are formed of pits to have a wobbling pattern and a straight pattern, respectively, the third transition area 27 included therebetween may be formed of a straight single pattern of pits, a straight specific pattern of pits, a straight random pattern of pits, a wobbling single pattern of pits, a wobbling specific pattern of pits, or a wobbling random pattern of pits. Alternatively, the third transition area 27 may be a mirror area.

When the first and second sub-areas 20a and 20b are both formed of pits to have a straight pattern, the third transition area 27 included therebetween may be formed of a straight single pattern of pits, a straight specific pattern of pits, a straight random pattern of pits, a wobbling single pattern of pits, a wobbling specific pattern of pits, or a wobbling random pattern of pits. Alternatively, the third transition area 27 may be a mirror area.

When the first and second sub-areas 20a and 20b are both formed of pits to have a wobbling pattern, the third transition area 27 included therebetween may be formed of a straight single pattern of pits, a straight specific pattern of pits, a straight random pattern of pits, a wobbling single pattern of pits, a wobbling specific pattern of pits, or a wobbling random pattern of pits. Alternatively, the third transition area 27 may be a mirror area.

When pits are formed in the first and second sub-areas 20a and 20b and the third transition area 27 in a wobbling pattern, they may be formed so that the amplitude of a wobble gradually increases or decreases.

The case where only the lead-in area 20 is divided into two sub-areas has been described above. However, the BCA 10, the user data area 30, or the lead-out area 40 may also be divided into a plurality sub-areas. In this case, a transition area may be formed between two adjacent sub-areas.

The first and second sub-areas 20a and 20b and the third transition area 27 may have either an identical track pitch or different track pitches. For example, the first sub-area 20a and the third transition area 27 have the same track pitch, and only the second sub-area 20b has a different track pitch. Alternatively, the third transition area 27 and the second sub-area 20b have the same track pitch, and only the first sub-area 20a has a different track pitch. When the first and second sub-areas 20a and 20b have different track pitches, the third transition area 27 may be formed so that its track pitch can gradually increase or decrease. For example, when a track pitch for the first sub-area 20a is "e" and a track pitch for the second sub-area 20b is "f" (f>e), the third transition area 27 is formed so that its track pitch can gradually increase from "e" to "f".

Figure 13:
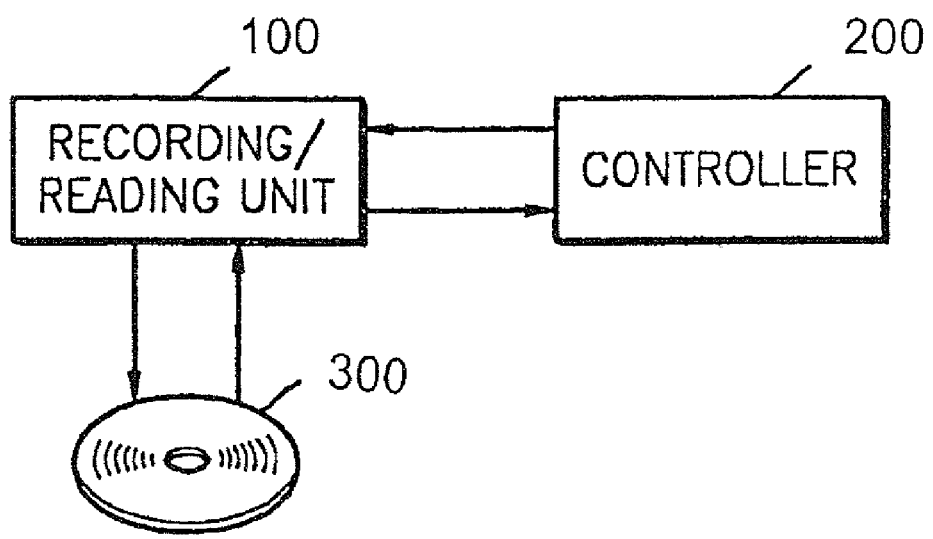
FIG. 13 is a block diagram of recording and/or reproducing system according to an embodiment of the present invention.

Referring to FIG. 13, there is shown a block diagram of a recording/reproducing system according to an embodiment of the present invention. The apparatus includes a recording/reading unit 100 and a controller 200. The recording/reading unit 100 writes data to and/or reproduces data from a write once recording medium 300 that is an information storage medium.

As described above, an optical information storage medium generated by and/or usable with a recording and/or reproducing apparatus according to the present invention includes a plurality of areas, and a transition area is included in at least one of boundary areas formed by the areas. For example, a transition area is included in at least one of an area between the BCA 10 and the lead-in area 20, an area between the lead-in area 20 and the user data area 30, and an area between the first and second sub-areas 20a and 20b. A pit pattern formed in the transition area may be the same as that formed in the area that is in front of or at rear of the transition area. The area in front of the transition area denotes an area that is closer to the center of the storage medium than the transition area. The area at rear of the transition area denotes an area that is more outside than the transition area in the radial direction of the storage medium.

The optical information storage medium generated by and/or usable with a recording and/or reproducing apparatus according to the present invention may be constituted with a single layer or a plurality of layers.

As described above, the optical information storage medium generated by and/or usable with a recording and/or reproducing apparatus according to the present invention is divided into a plurality of areas according to function or purpose, and a transition area is included between two adjacent areas. Thus, data is smoothly reproduced at a low error generation rate. Also, since the optical information storage medium according to the present invention provides standards for the transition area, it is compatible with existing optical information storage media.

Although a few embodiments of the present invention have been shown and described, the present invention is not limited to the disclosed embodiments. Rather, it would be appreciated by those skilled in the art that changes may be made in these embodiments without departing from the principles and spirit of the invention, the scope of which is defined by the claims and their equivalents.

What is claimed is:

1. A reproducing and/or recording apparatus for use with an optical information storage medium, comprising:
   a pick-up unit which reproduces and/or records data from and/or on the optical information storage medium; and
   a controller which controls the pick-up unit to reproduce data from at least one of a burst cutting area (BCA), a lead-in area, a user data area, and a lead-out area of the optical storage medium,
   wherein a first transition area is provided between the burst cutting area (BCA) and the lead-in area,
   the lead-in area comprises a first area having a first track pitch, a second area having a second track pitch different from the first track pitch, and a second transition area provided between the first area and the second area, and the track pitch of the second transition area is changed from the first track pitch to the second track pitch.

2. An optical information storage medium comprising:
   a burst cutting area;
   a lead-in area comprising a first area having a first track pitch and a second area having a second track pitch different from the first track pitch;
   a user data area; and
   a lead-out area,
   wherein a first transition area is provided between the burst cutting area and the lead-in area and a second transition area is provided between the first area and the second area, and the track pitch of the second transition area is changed from the first track pitch to the second track pitch.

* * * * *